United States Patent [19]
Gregerson et al.

[11] Patent Number: 5,612,957
[45] Date of Patent: Mar. 18, 1997

[54] ROUTING METHOD IN SCALABLE DISTRIBUTED COMPUTING ENVIRONMENT

[75] Inventors: Daniel P. Gregerson, Half Moon Bay; David R. Farrell, San Francisco; Sunil S. Gaitonde; Ratinder P. Ahuja, both of Daly City; Krish Ramakrishnan, Union City; Muhammad Shafiq, El Granada; Ian F. Wallis, Cupertino, all of Calif.

[73] Assignee: Peerlogic, Inc., San Francisco, Calif.

[21] Appl. No.: 519,634

[22] Filed: Aug. 25, 1995

Related U.S. Application Data

[62] Division of Ser. No. 293,073, Aug. 19, 1994, Pat. No. 5,526,358.

[51] Int. Cl.$^6$ .................................................. H04L 12/66
[52] U.S. Cl. ................................. 370/401; 395/309
[58] Field of Search .............. 370/60, 60.1, 85.13–85.14, 370/94.1, 94.2, 85.1, 85.2, 85.3; 395/200.01, 200.02, 200.03, 309

[56] References Cited

U.S. PATENT DOCUMENTS

| | | | |
|---|---|---|---|
| 5,088,032 | 2/1992 | Bosack | 370/94.1 |
| 5,214,646 | 5/1993 | Yacoby | 370/85.13 |
| 5,251,213 | 10/1993 | Videlock et al. | 370/85.13 |
| 5,280,480 | 1/1994 | Pitt et al. | 370/94.3 |
| 5,323,394 | 6/1994 | Perlman | 370/85.13 |
| 5,361,256 | 11/1994 | Doeringer et al. | 370/94.1 |
| 5,425,026 | 6/1995 | Mori | 370/94.1 |
| 5,425,028 | 6/1995 | Britton et al. | 370/94.1 |
| 5,426,637 | 6/1995 | Derby et al. | 370/85.13 |
| 5,430,728 | 7/1995 | Narayanan et al. | 70/85.13 |

*Primary Examiner*—Alpus H. Hsu
*Assistant Examiner*—Seema S. Rao
*Attorney, Agent, or Firm*—McCutchen, Doyle, Brown & Enersen

[57] ABSTRACT

Methods for routing packets from a source node to a destination node using at least one context bridge. Each node has a routing protocol, with the context bridge being one of many context bridges in a heterogeneous network having many nodes. In one embodiment, the method includes the steps of receiving a packet at the source node, and determining whether the destination node of the packet has a routable protocol. If the destination has no routable protocol, a route discovery packet is sent to discover one or more context bridges so as to automatically route the packet from the source to the destination node. Based on the discovery, the packet is routed to the destination through one or more context bridges. If the destination has a routable protocol, the packet is routed from the source to the destination using the routable protocol. In another embodiment, the method includes the steps of setting up a list of context bridges and the communication protocols handled by each context bridge in the list, and listening for routing information packets, which are periodically broadcast by other context bridges informing recipients of the communication protocols handled by the broadcasting context bridge. Based on the broadcast, the list is updated using the information contained in the received routing information packets.

2 Claims, 34 Drawing Sheets

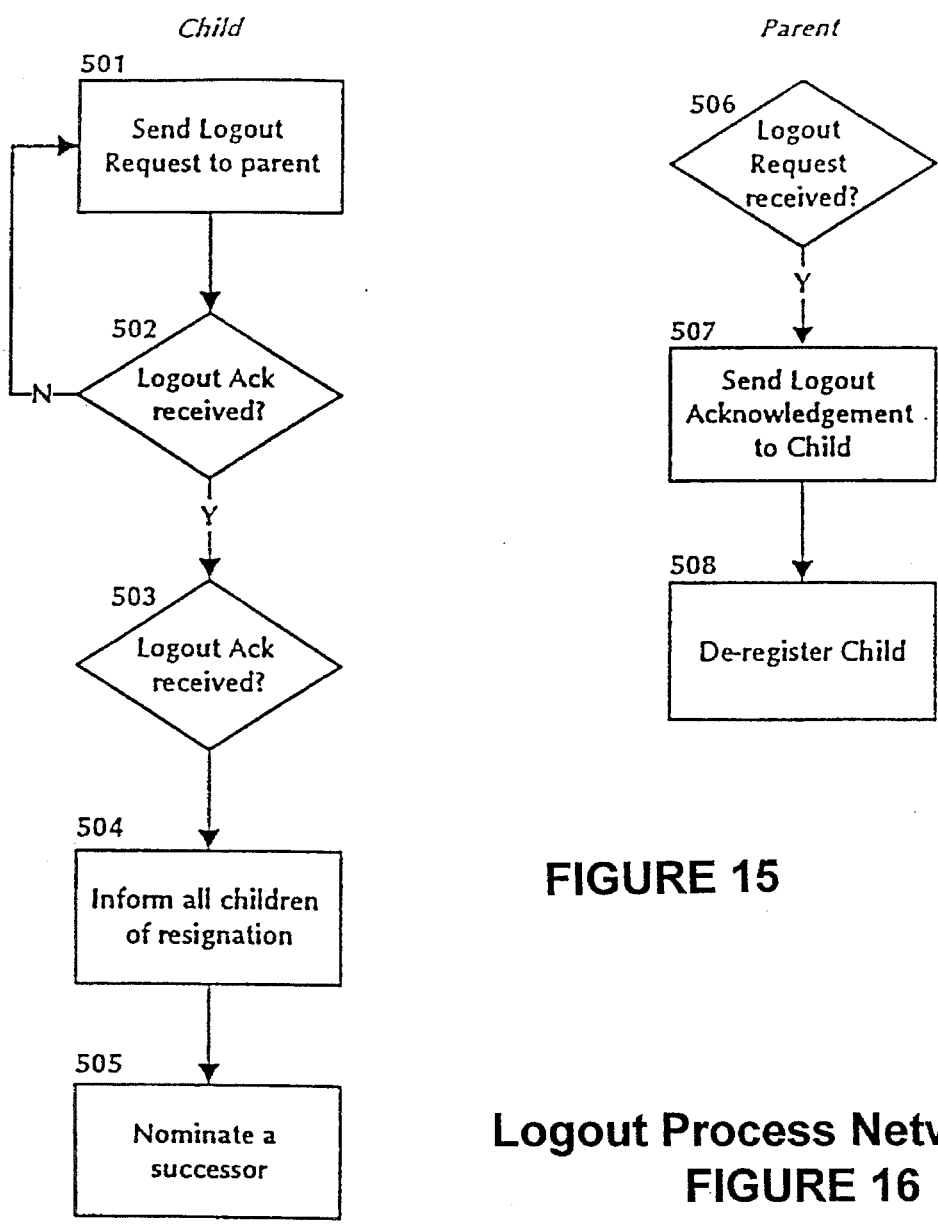
FIGURE 15
**Logout Process Network Flow
FIGURE 16**
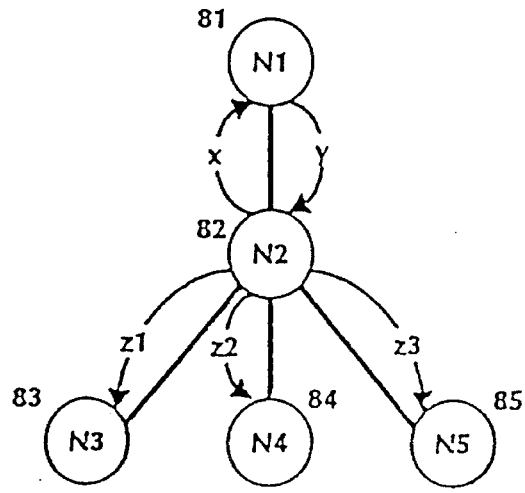

*Find Query Process at Area Manager Node*

*Find Query Process at (Manager > Area Manager) Node*

*Persistent Find Query Process at Area Manager Node*

*Persistent Find Query Process at (Manager > Area Manager) Node*

*Clean Persistent Find Query Process at Area Manager Node*

*Clean Persistent Find Query Process at (Manager > Area Manager) Node*

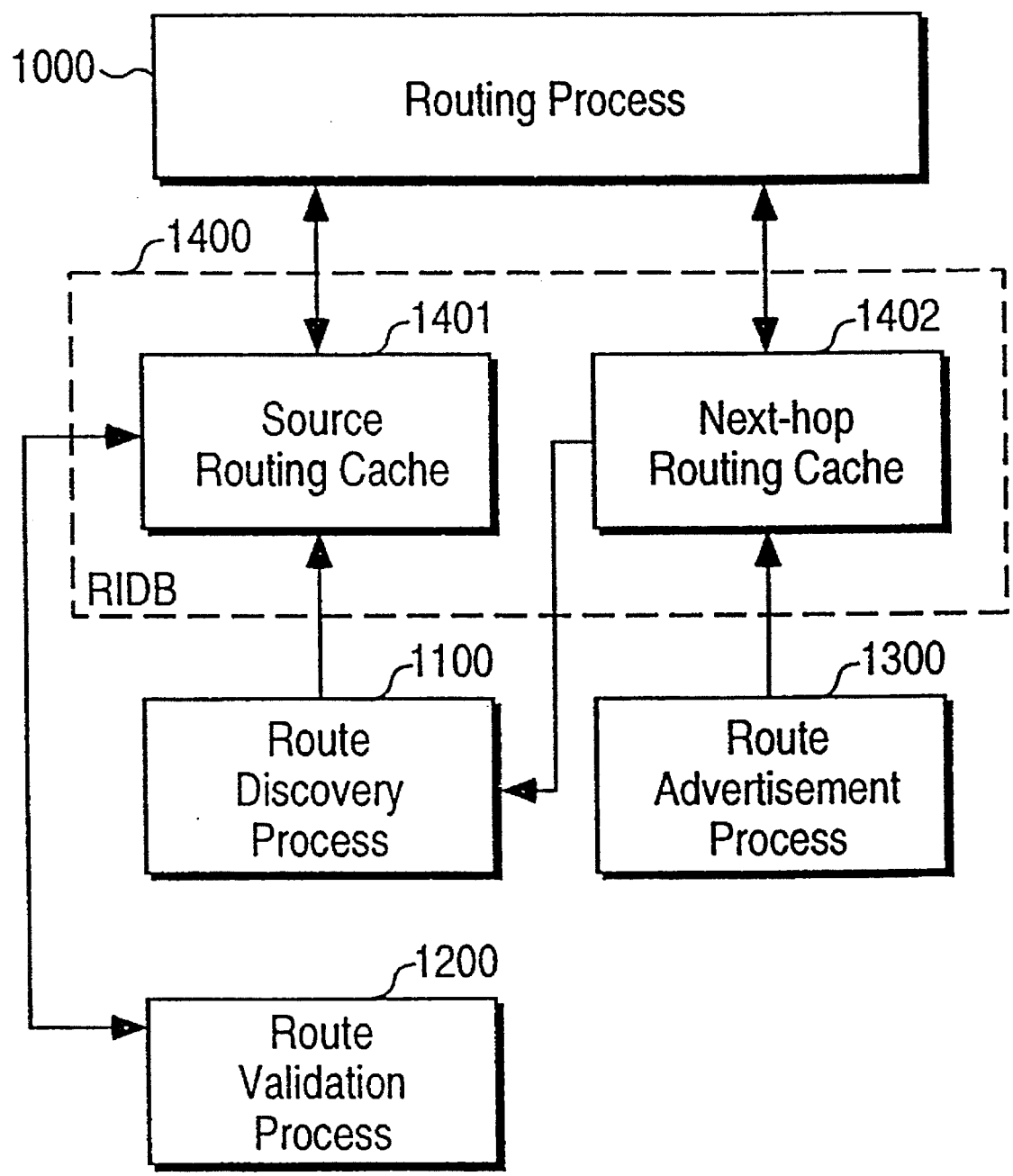
Context Bridge Layer  FIG. 29A

ROUTING METHOD IN SCALABLE DISTRIBUTED COMPUTING ENVIRONMENT

This application is a division of application Ser. No. 08/293,073, filed on Aug. 19, 1994, now U.S. Pat. No. 5,526,358.

BACKGROUND OF THE INVENTION

The present invention relates to distributed computing systems and is more particularly directed to an architecture and implementation of a scalable distributed computing environment which facilitates communication between independently operating nodes on a single network or on interconnected networks, which may be either homogeneous or heterogeneous.

In today's business environment, corporate structures are being increasingly reshaped due to the dynamics of mergers and acquisitions, globalization and the need for real-time communication with customers, suppliers and financial institutions. In addition, immediate access to information and the need to manipulate that information quickly have become critical in establishing and maintaining competitive advantage. This requires that corporate data and the computer programs which manipulate that data be deployed in a fundamentally new way; in a distributed rather than a centralized, monolithic manner.

With distributed computing, programs and data are logically positioned so that they can be processed as near as possible to the users that interact with them. In theory, this allows the corporation to operate more reliably and efficiently by reducing communications overhead and exploiting the underutilized processing power of personal, group, and departmental computing resources. By distributing workload over many computers, information processing resources can be optimized for a given individual, work group or purpose. This approach allows data and processes to be distributed and replicated so that performance and reliability can be more easily maintained as the demands on the system increase. The characteristics of increased granularity and scalability also provide important benefits relating to software reusability, i.e., the same component may be used in several different applications, thus reducing both development and maintenance time and costs.

Because of these demands, there is a movement toward enterprise-wide virtual computing in which the entire resources of the network appear to the user to be locally resident at his or her desktop computer or terminal. The traditional monolithic centralized corporate information processing model is yielding to a distributed, fine-grained approach. This transformation to virtual, dynamic enterprise computing requires that mission critical core systems be implemented using a distributed architecture in which localized computing resources (program elements and data) are seamlessly interlinked by virtual networks.

However, in today's corporate information systems, individual applications typically exist in heterogeneous environments that do not interoperate. Businesses are faced with the task of connecting incompatible systems while maintaining an ever increasing number of disparate operating systems and networking protocols over a wide geographic area. Corporate mergers and acquisitions are again on the rise, and the need to integrate installed heterogeneous networks into a single enterprise wide network, not once but multiple times, is needed. Further, corporations have become global entities and their information systems must now function over multiple time zones, requiring those systems to be "time-independent." Moreover, as corporations themselves are dynamically transformed, so are the information systems that support their business operations. Thus, the corporate computing environment must be "open," i.e., it must be flexible enough to easily migrate to new standards while maintaining the integrity and access to its existing "legacy" systems and data. Legacy systems typically rely on the use of static tables to keep track of networked resources. Such systems do not support dynamic recovery and are not easily scalable to enterprise-wide deployment because of the extremely high overhead that would be required to maintain these tables in a constantly changing environment.

In existing systems, in order for one resource connected to the network to discover the existence of another resource, both must be "alive." As the total number of resources connected to the network expands, it becomes vitally important to have a mechanism for time-independent resource discovery whereby the network automatically is made aware of new resources as they become available.

Existing systems are also limited by the availability of a fixed number of roles, or hierarchical levels, that can be assumed by any node, e.g., machine, area, group, domain, network, etc. This limitation presents significant problems when merging or integrating two or more existing networks having different hierarchical structures. In addition, in prior art systems, if a node assumes multiple roles, the relationship between those roles is prescribed. That is, in order to function at level one (e.g., machine) and level 3 (e.g., group manager), the node must also assume the level 2 function (e.g., area manager). This limitation can severely degrade system performance and recovery.

Prior attempts to address the problems associated with establishing robust, efficient enterprise-wide computing environments, such as real time messaging, message queuing, remote procedure calls, interprocess communication, and broadcast/publish and subscribe represent partial solutions at best. Because true distributed computing presupposes peer-to-peer communication (since master process failure necessarily leads to failure of slave processes), client-server based approaches to realizing the goal of enterprise computing represent suboptimal solutions. Existing peer-to-peer systems utilizing static tables do not allow dynamic recovery and present serious problems of scalability and maintenance.

SUMMARY OF THE INVENTION

The present invention is a dynamic, symmetrical, distributed, real-time, peer-to-peer system comprised of an arbitrary number of identical (semantically equivalent) instances, i.e., kernels, that together form a logical tree. The kernels exhibit unified and consistent behavior at run time through a self-configuring and self-maintaining logical view of the network. Each kernel resides at a network node that has one or more resources associated with it. The kernels dynamically locate one another in real-time to form and maintain a hierarchical structure that supports a virtually unlimited number of independently running kernels. The system maintains its logical view of the network and user-developed programmatic resources regardless of the number and combinations of transport protocols and underlying mix of physical topologies. The system's communications services utilize a dynamic context bridge to communicate between end nodes that may not share a common transport protocol stack, thereby allowing applications residing on different stacks to communicate with one another automatically and transparently.

The system is designed to support all forms of digitized communication, including voice, sound, still and moving images, mass file transfer, traditional transaction processing and any-to-any conferencing such as "groupware" applications would require. The system is also designed to operate over any type of networking protocol and medium, including ISDN, X.25, TCP/IP, SNA, APPC, ATM, etc. In all cases, the system delivers a high percentage, typically 60–95%, of the theoretical transmission capacity, i.e., bandwidth, of the underlying medium.

As new resources join (or rejoin) the network, the kernel residing at each node, and thus each resource connected to that node, automatically and immediately becomes accessible to all applications using the system. The role(s) assumed by any node within the managerial hierarchy employed (e.g., area manager, domain manager, network manager, etc.) is arbitrary, i.e., any node can assume one or multiple roles within the hierarchy, and assuming one role neither requires nor precludees assumption of any other role. Further, the roles dynamically change based on the requirements of the network, i.e., as one or more nodes enter or leave the network. Thus, the individual kernels dynamically locate one another and negotiate the roles played by the associated nodes in managing the network hierarchy without regard to their physical location. In addition, the number of possible roles or levels that may be assumed by any node is not limited and may be selected based on the particular requirements of the networking environment.

BRIEF DESCRIPTION OF THE DRAWINGS

These and other features and advantages of the present invention will be better and more completely understood by referring to the following detailed description of preferred embodiments in conjunction with the appended sheets of drawings, of which:

FIG. 15 is a flow chart of a logout process in accordance with the present invention.

FIG. 16 is a diagram showing the logout communication between different nodes in accordance with the present invention.

FIG. 29A shows the components of a context bridge of the present invention.

DETAILED DESCRIPTION OF THE INVENTION

Figure 1:
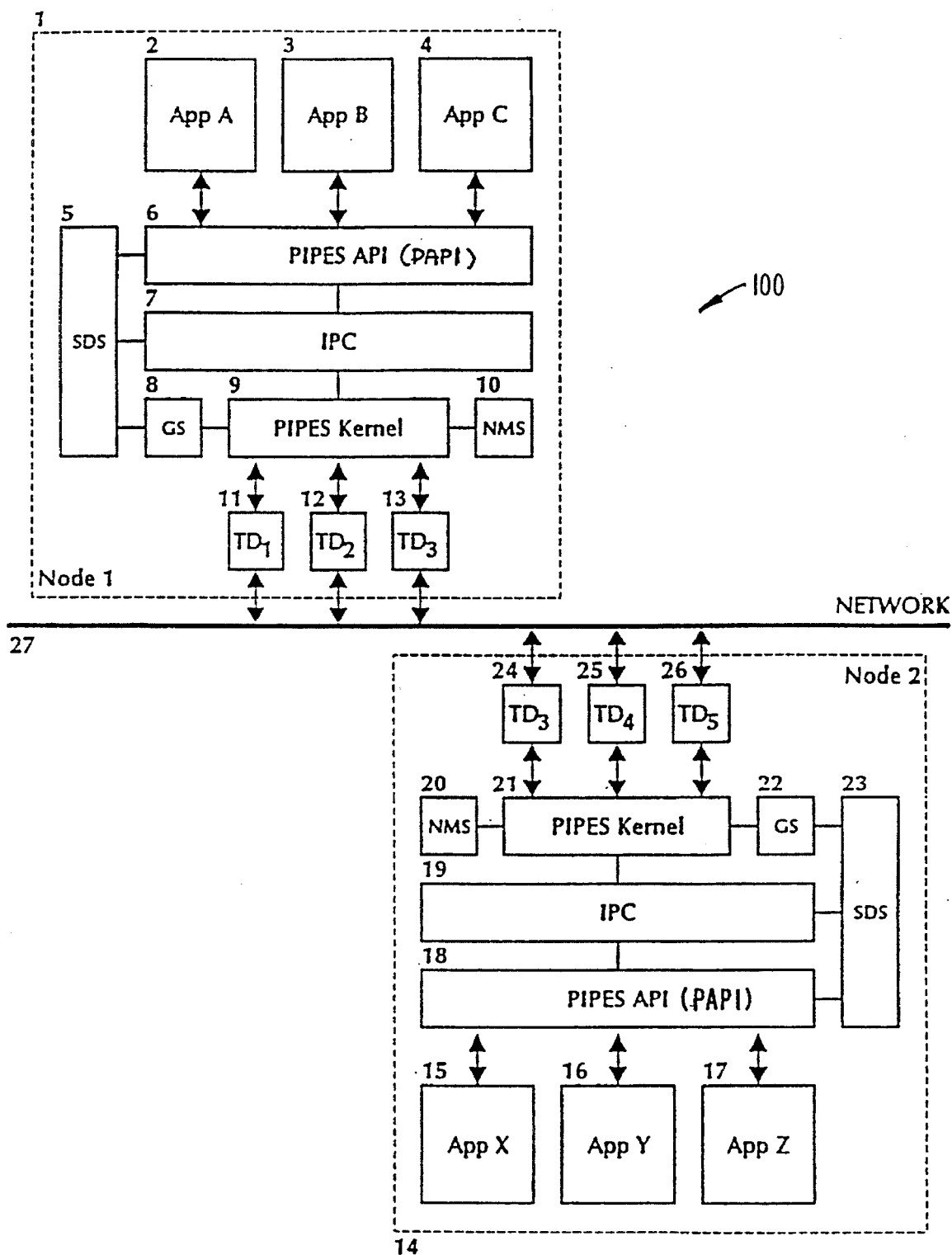
FIG. 1 is a drawing showing a distributed computing system in accordance with the present invention.

FIG. 1 shows a distributed computing system 100 in accordance with the present invention. The implementation of system 100 by the assignee of the present application is referred to as the PIPES Platform ("PIPES"). In system 100, two nodes, Node 1 (shown as block 1) and Node 2 (shown as block 14), communicate through a physical network connection (shown as line 27). It should be obvious to a person skilled in the art that the number of nodes connected to network 27 is not limited to two.

The structures of the nodes are substantially the same. Consequently, only one of the nodes, such as Node 1, is described in detail. Three applications, App. A (shown as block 2), App. B (shown as block 3), and App. C (shown as block 4), run on Node 1. These applications are typically written by application developers to run on PIPES. The PIPES software includes a PIPES Application Programmer Interface ("PAPI") (shown as block 6) for communicating with Apps. A–C. PAPI 6 sends messages to a single PIPES Kernel (shown as block 9) executing at Node 1 through Interprocess Communication (IPC) function calls (shown as block 7). Kernel 9 sends and receives messages over network 27 through transport device drivers $TD_1$ (shown as block 11), $TD_2$ (shown as block 12), and $TD_3$ (shown as block 13).

Similarly, Node 2 has three applications running on it, App. X (shown as block 15), App. Y (shown as block 16), and App. Z (shown as block 17), and communicating with a single PIPES Kernel (shown as block 21) running at Node 2 through PAPI (shown as block 18) and IPC (shown as block 19). Node 2 supports three different network protocols, and thus contains three transport driven $TD_3$ (shown as block 24), $TD_4$ (shown as block 25), and $TD_5$ (shown as block 26).

For example, if App. A at Node 1 needs to communicate with App. Z at Node 2, a message travels from App. A through PAPI 6, IPC 7, and kernel 9. Kernel 9 uses its transport driver $TD_3$ to send the message over network 27 to transport driver $TD_3$ at Node 2. The message is then passed to kernel 21 at Node 2, IPC 19, PAPI 18, and finally to App. Z.

PIPES also provides generic services used by all of its component parts. Network Management Services (shown as blocks 10 and 20) provides access for a PIPES Network Management Agent (not shown) to monitor the kernels' network- and system-level counters, attributes, and statistics. Generic Services (shown as blocks 8 and 22) provide a common interface for kernels 9 and 21 to operating system services, including hashing, trees, address manipulation, buffer management, queue management, logging, timers, and task scheduling. System Dependent Services (shown as blocks 5 and 23) provides services specific to operating system, platform, environment and transports on the nodes. These services are used by Genetic Services (shown as blocks 8 and 22) to realize a generic service within a given operating system or platform environment.

Figure 2:
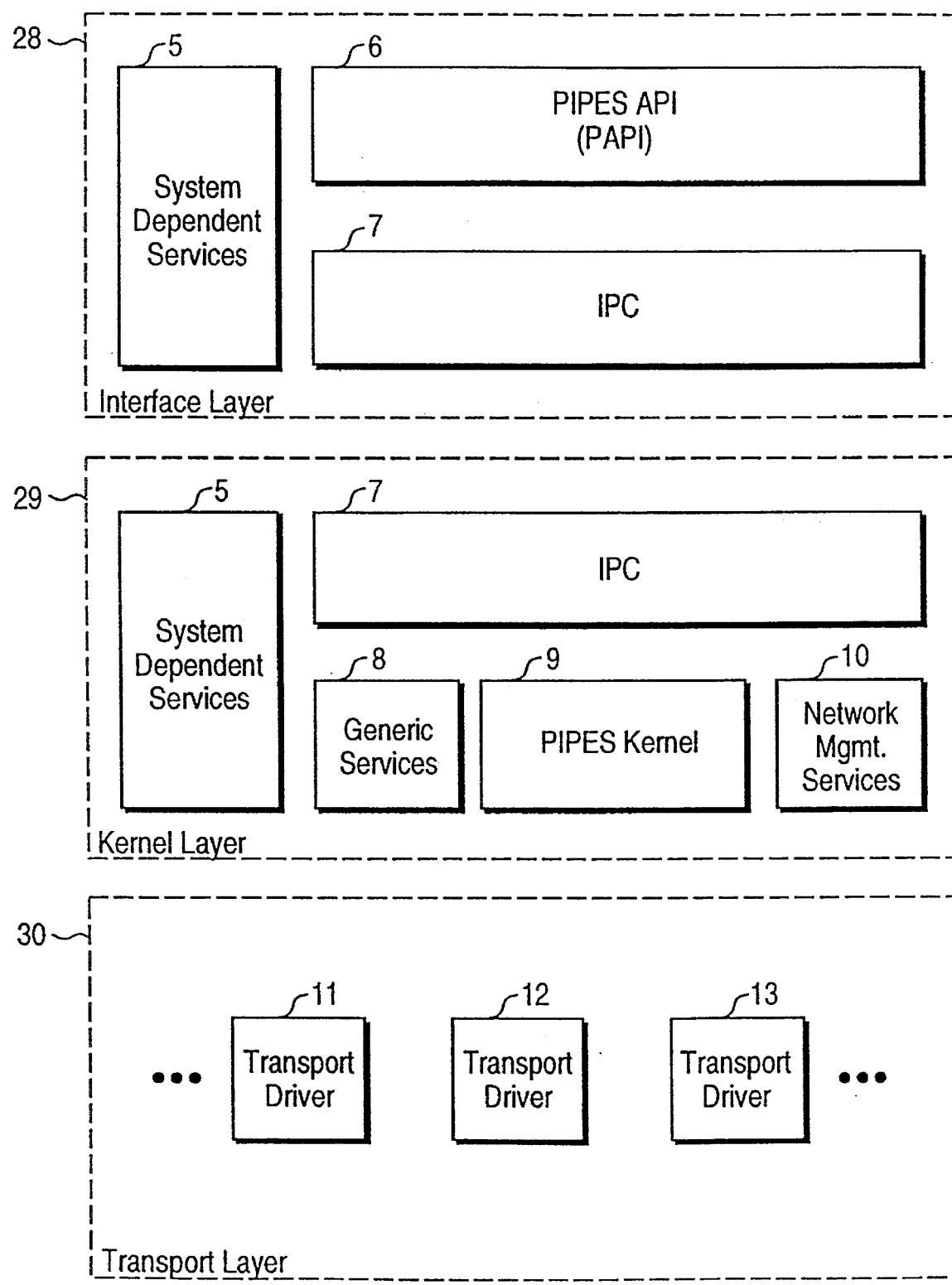
FIG. 2 is a detailed block diagram of one of the nodes in the system of FIG. 1.

FIG. 2 shows a more detailed block diagram of the PIPES internal architecture within Node 1 of system 100. The PIPES architecture is divided into three different layers: the Interface Layer (shown as block 28), the Kernel Layer (shown as block 29), and the Transport Layer (shown as block 30). Interface Layer 28 handles queries from and responses to the applications that are accessing the PIPES environment through PAPI 6. Interface Layer 28 is embodied in a library which is linked to each application (e.g., Apps. A–C) which accesses kernel 9. Kernel Layer 29 provides programmatic resource and communication management services to applications that are accessing PIPES, allowing communication between end-nodes that may not share a transport protocol stack. Transport Layer 30 consist of the transport device driven 11, 12, and 13 for the network protocols supported by Node 1. Each transport driver provides access from kernel 9 to a network transport protocol provided by other vendors, such as TCP/IP, SNA, IPX, or DLC. Transport Layer 30 handles all transport-specific API issues on a given platform for a given transport discipline.

Figure 3:
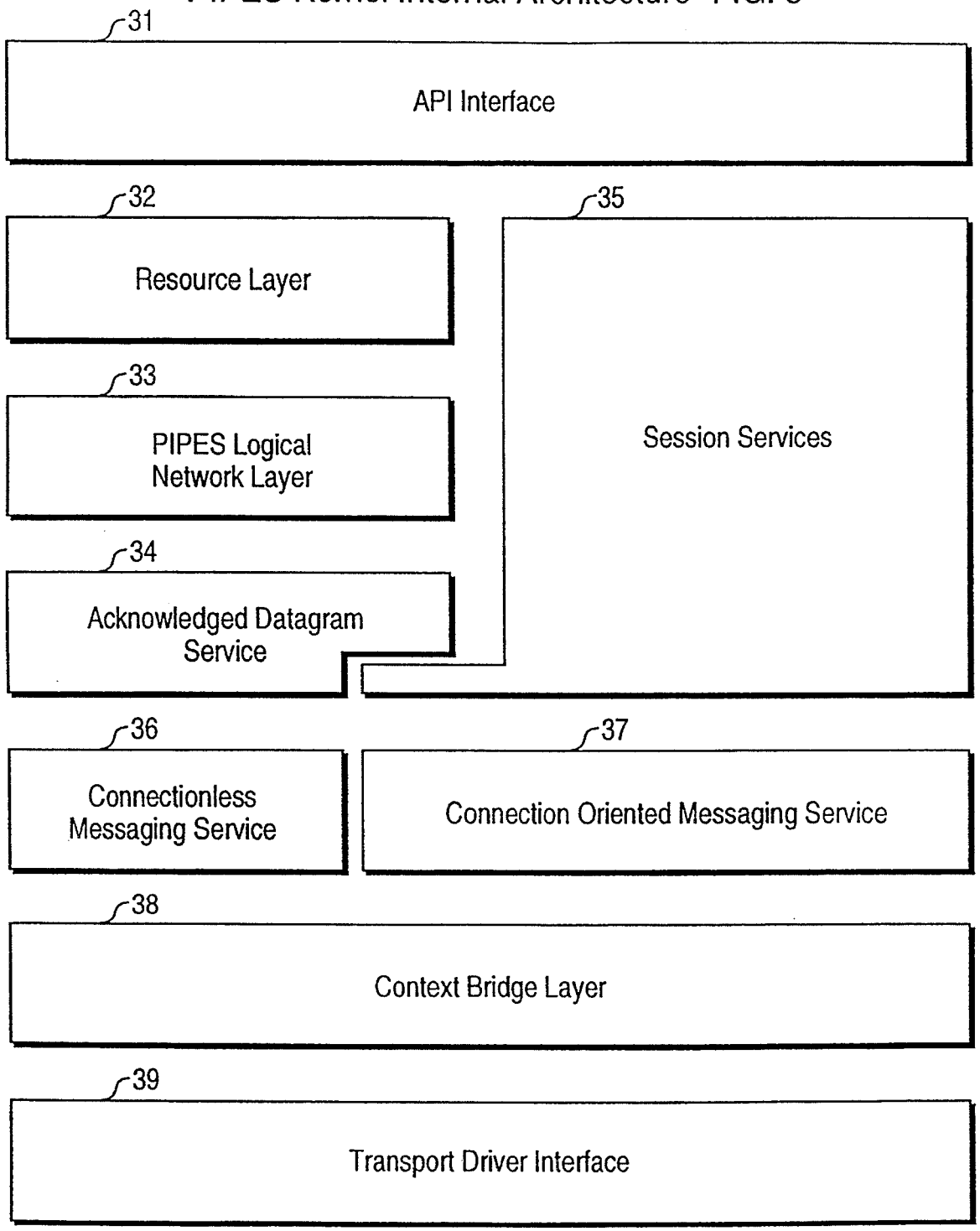
FIG. 3 is a block diagram showing the structure of a kernel in accordance with the present invention.

FIG. 3 illustrates the internal architecture of kernel 9. Kernel 9 contains an API Interface (shown as block 31) which is the interface to PAPI 6 of FIG. 2. API Interface 31 handles requests from Interface Layer 28 and returns responses to those requests. It recognizes an application's priority and queues an application's messages based on this priority. API Interface 31 also handles responses from the Resource Layer (shown as block 32) and Session Services (shown as block 35), and routes those responses to the appropriate application.

Resource Layer 32 registers an application's resources within a PIPES Logical Network ("PLN") layer (shown as block 33), provides the ability to find other PAPI resources within PIPES, and handles the de-registration of resources within the network. In addition, Resource Layer 32 implements a "Persistent Find" capability which enables the locating of resources that have not yet been registered in PLN 33.

PLN 33 maintains knowledge of the logical, hierarchical relationships of the nodes within PIPES to enforce a dynamic administrative framework. PLN 33 handles the election of managers, the transparent reestablishment of management hierarchies as a result of physical network faults. PLN 33 employs a system of "heartbeat" messages which is used to monitor the status of nodes within the network and identify network failures. This layer also handles requests and returns responses to Resource Layer 32 and an Acknowledged Datagram Service ("AKDG", shown as block 34).

AKDG 34 provides best-effort datagram service with retransmission on failures for users. AKDG 34 handles the sending and receiving of messages through Connectionless Messaging Service (CLMS) 36 and Session Services 35.

Session Services 35 allocates, manages, and deallocates sessions for users. Session management includes sending and receiving data sent by the user in sequence, ensuring secure use of the session, and maintaining the message semantics over the Connection Oriented Messaging Service (COMS) stream protocol. Session Services 35 also multicasts PAPI application messages over sessions owned by the PAPI application. Session Services 35 interacts with COMS 37 to satisfy requests from AKDG 34 and API Interface 31.

CLMS 36 transfers data without a guarantee of delivery. It also interacts with Context Bridge layer 38 to satisfy the requests from AKDG 34.

COMS 37 manages connections opened by Session Services 35. COMS 37 provides high-performance data transfer, including the fragmentation and reassembly of messages for users. COMS 37 modifies message size based on maximum message sizes of hops between connection endpoints.

Context Bridge layer 38 insulates PAPI applications from the underlying networks by performing dynamic transport protocol mapping over multiple network transports, thus enabling data transfer even if the end-to-end protocols are different.

The Transport Driver Interface (shown as block 39) handles communication between transport-specific driven and the CLMS 36 and COMS 37 layers. This interface contains generic common code for all transport drivers.

PLN Layer

PLN 33 is a hierarchical structure imposed by the system administrator on a set of machines executing kernels. These kernels unify at run time to form a hierarchical network with dynamically elected managers that manage a given level of the hierarchy. The PLN name space is divided into five different levels: normal, area, group, domain, and network. All kernels at startup have normal privileges. They assume a managerial role depending on their configuration in the network and such real-time considerations as the number of roles already assumed. Thus, administrative functions will be distributed evenly among the member kernels, leading to better performance and faster recovery. It should be appreciated that the number of levels is not limited to five, and any number of levels can be implemented in the system, as explained below.

In PLN 33, the primary roles played by the various managers between the Network Manager and Area Manager (e.g., Domain Manager and Group Manager) are essentially the same: to maintain communication with its parent and children, and to route Resource Layer 32 traffic. In addition to these functions, any manager between the Network Manager and Area Manager (e.g., Domain or Group) also provides persistent find source caching services as described below in connection with FIGS. 22 and 23. The Area Manager, in addition to these functions described above, provides caching services for resources advertised by its children, including all of the kernels in the Area Manager's name space. Therefore, the Area Manager is crucial to the orderly function of PLN 33, which is built from the ground up by filling the Area Manager role before any other role in the hierarchy. By default, any kernel can become an Area Manager.

Figure 4:
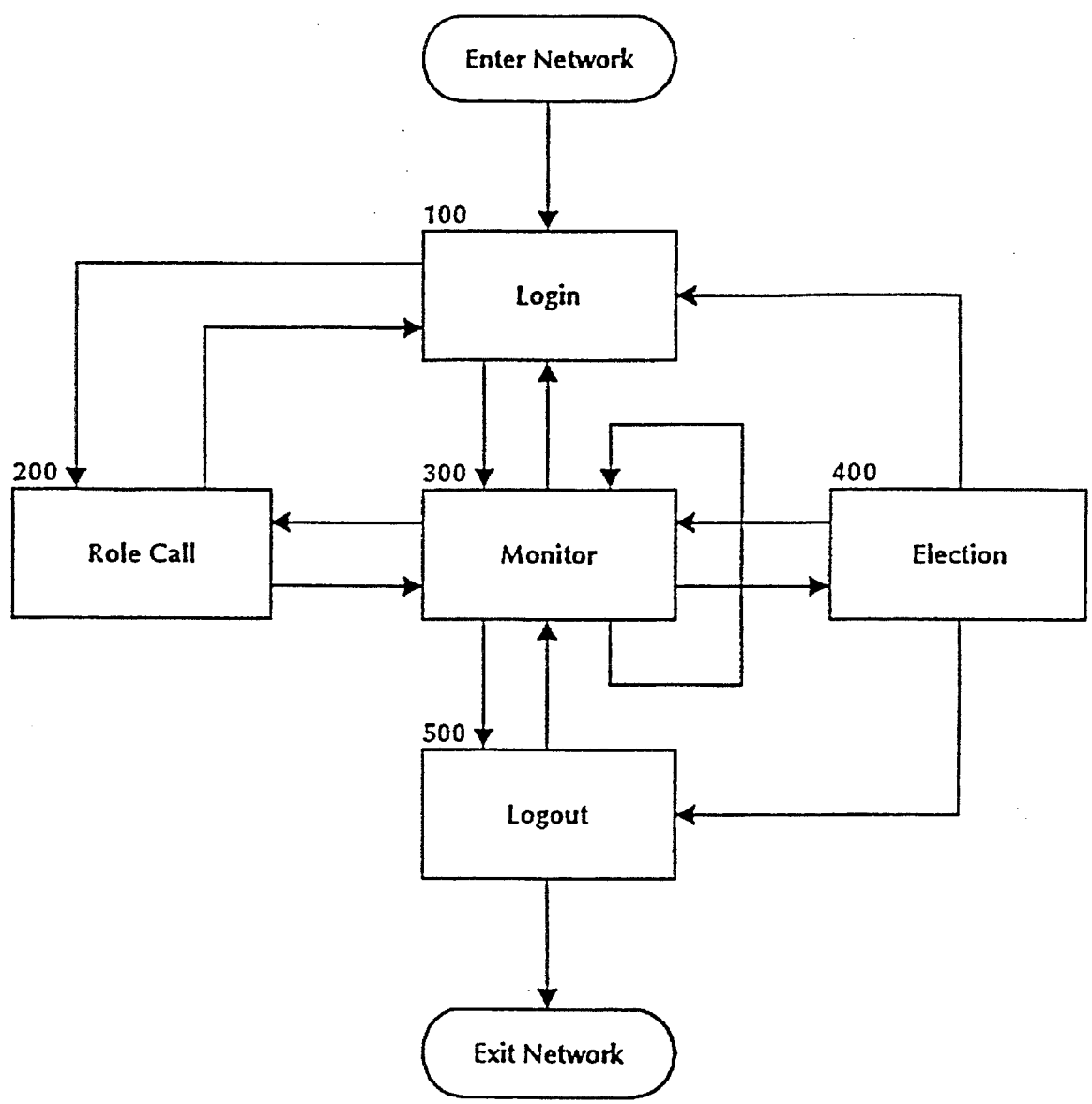
FIG. 4 is a flow chart of the PIPES logical network (PLN) of the present invention.

As shown in FIG. 4, the PLN building and maintenance algorithm comprises five main processes: Login (shown as block 100), Role Call (shown as block 200), Monitor (shown as block 300), Election (shown as block 400), and Logout (shown as block 500). In this description, the following terms are used in order to allow for the appropriate abstraction. The number of levels in PLN 33 is defined by MinLevel and MaxLevel. The kernels that have normal privileges are configured at MinLevel and are not managers. On the other hand, a kernel that is the Network Manager is configured at MaxLevel and has the potential to become the Network Root. The configuration parameter MaxStatus imposes a ceiling on the highest level of which the kernel can be a manager. A kernel at level n is termed to be a child of its parent kernel at level n+1 provided that the two kernels have the same name above level n.

Login

Figure 5:
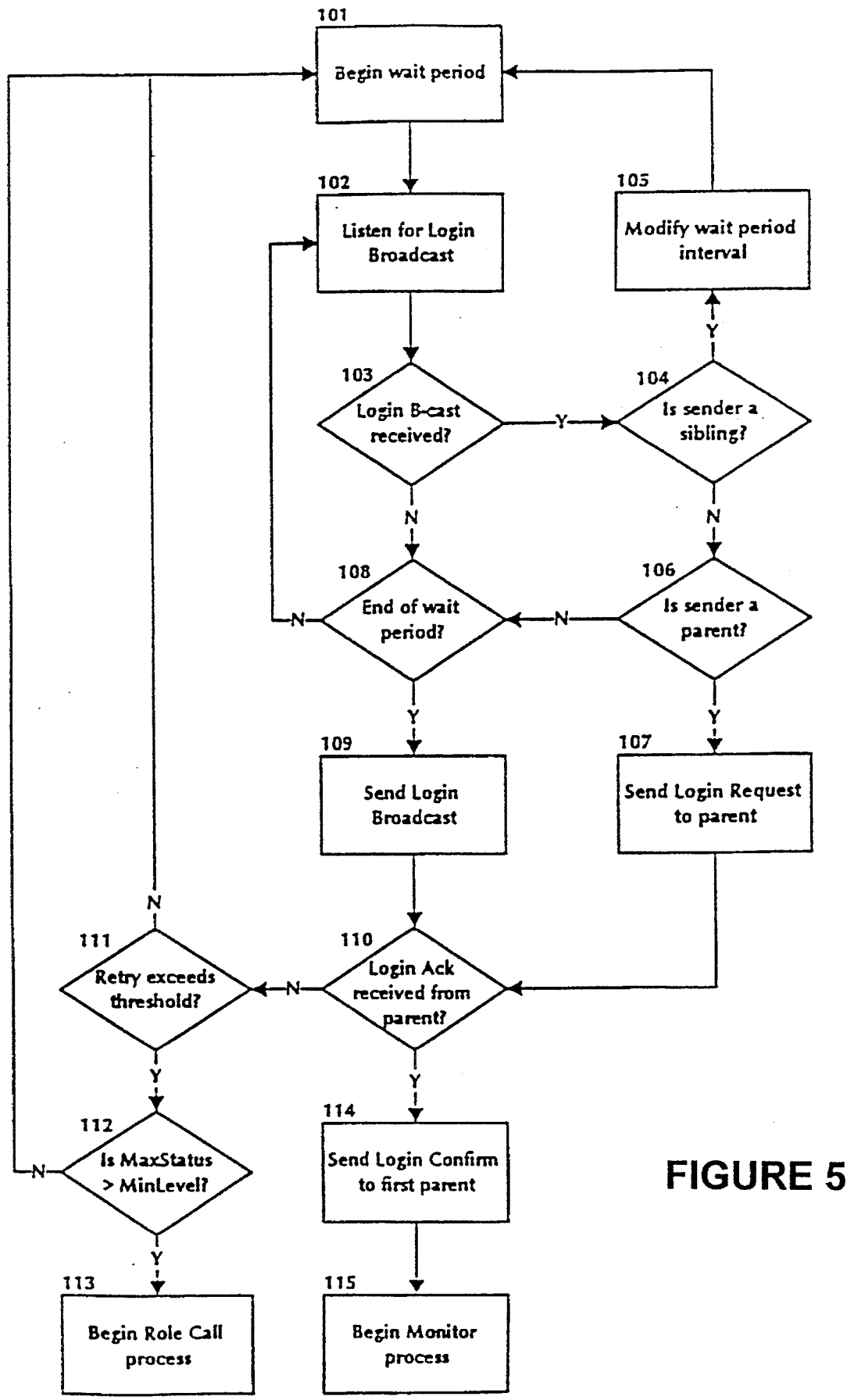
FIG. 5 is a flow chart of a child login procedure in accordance with the present invention.
Figure 6:
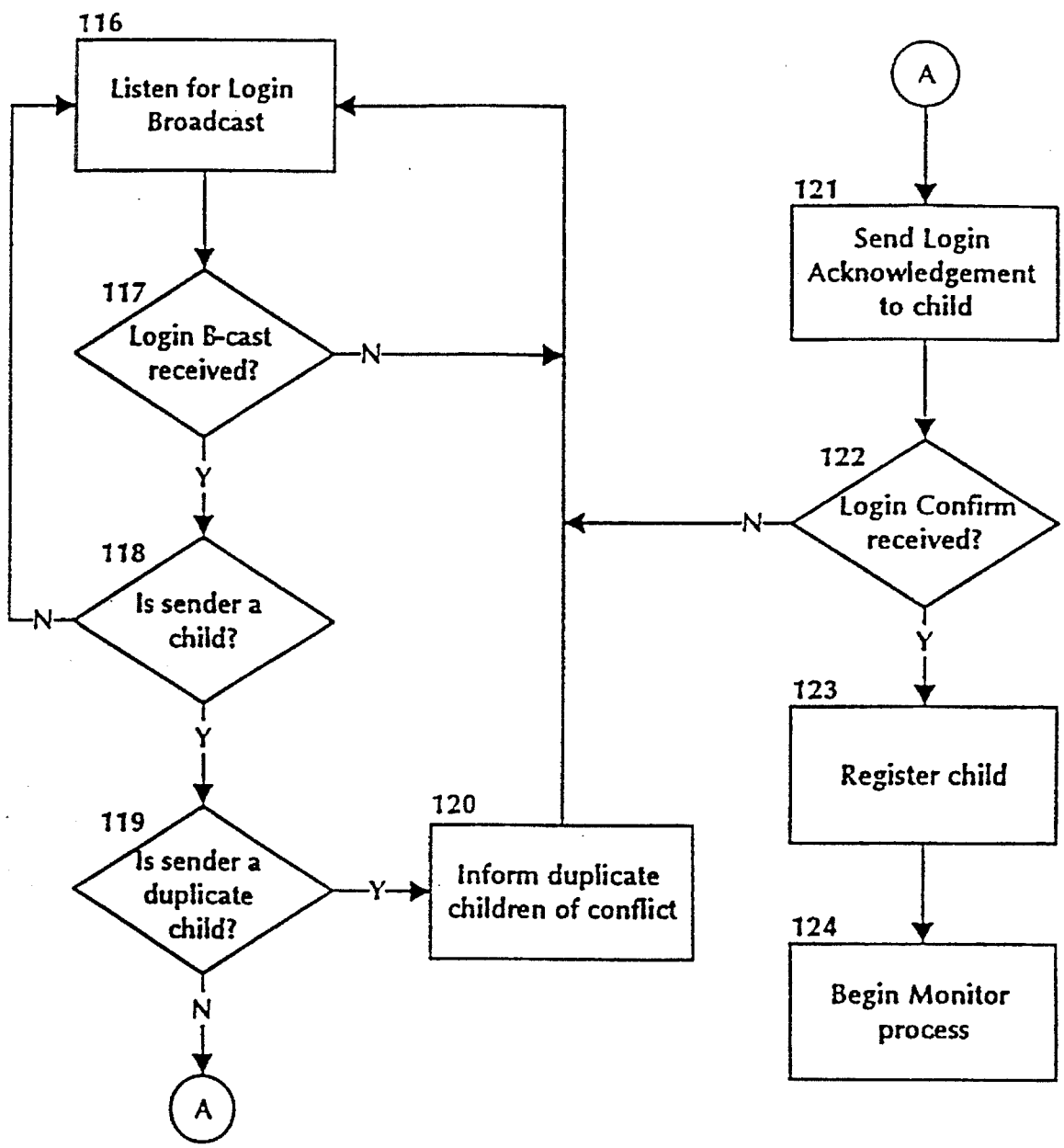
FIG. 6 is a flow chart of a parent login procedure in accordance with the present invention.
Figure 7:
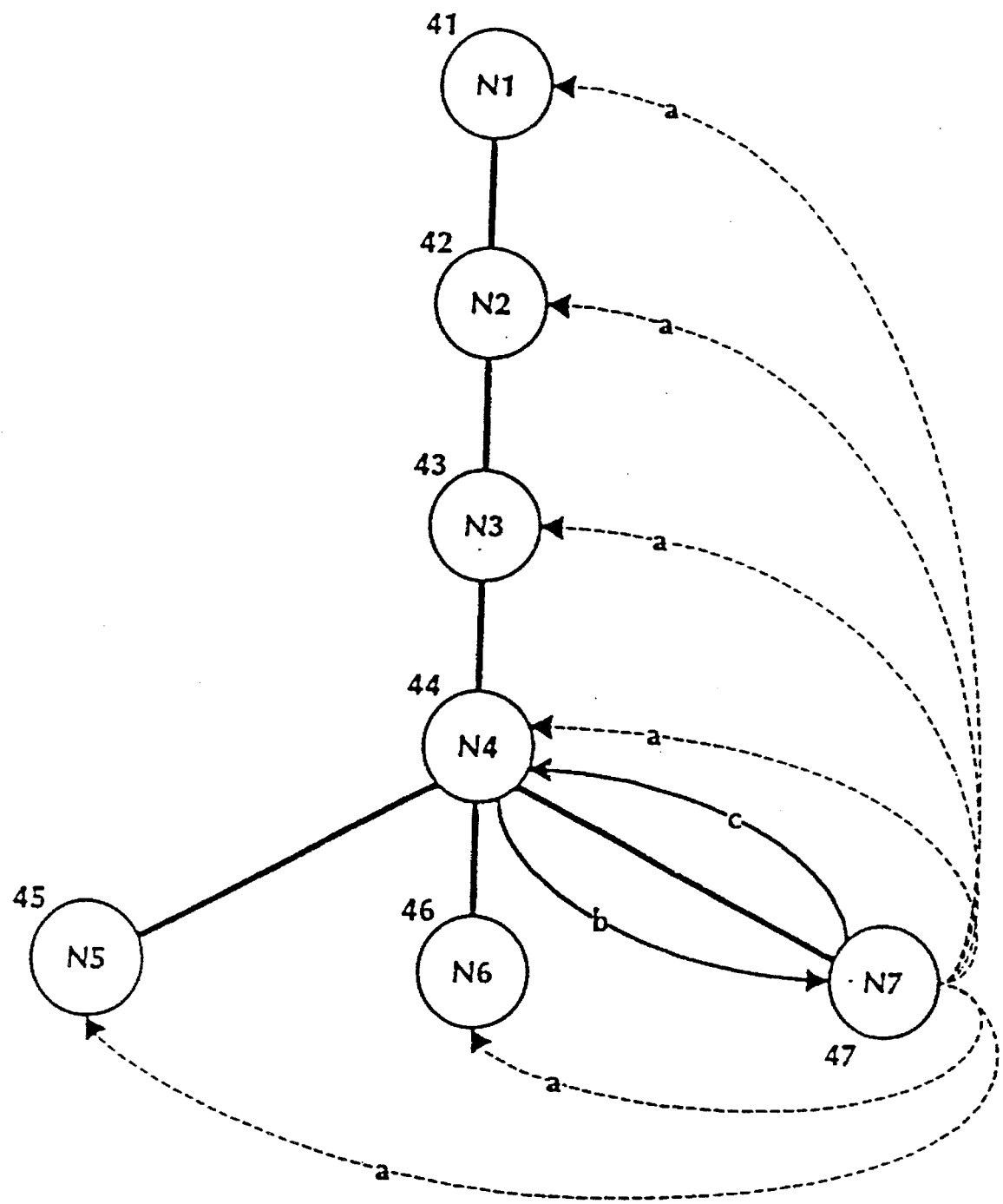
FIG. 7 is a diagram showing the login communication between different nodes in accordance with the present invention.

FIGS. 5 and 6 depict the Login procedure executed at the child and parent nodes in PLN 33. Login is a process by which a child kernel locates and registers with a parent kernel. FIG. 7 illustrates the messages passed between kernels during a hypothetical execution of the Login process by which a kernel in node N7 (shown as circle 37 and referred to as kernel N7) runs the Login process to enter the network.

A kernel enters the network by running the Login process to locate its parent kernel. The child kernel first enters a wait period (step 101) during which the child listens for other login broadcasts on the network (step 102). If a login broadcast is received during the wait period (step 103), the child kernel reads the message. The information in the message is sufficient for the child to ascertain the identity of its parent and siblings. If the originator of the message is a sibling (step 104), the child kernel modifies its Login wait period interval (step 105) in order to prevent login broadcasts from inundating the network. If the originator of the message is a parent (step 106), the child kernel sends a login request to the parent (step 107) and waits for an acknowledgement. If a login broadcast is not received, the child kernel continues to listen for a login broadcast until the end of the wait period (step 108). At the end of the wait period, the child kernel sends a login broadcast on the network (step 109).

In FIG. 7, kernel N7 is attempting to login to the PIPES network by sending a login broadcast message (represented by dotted line a) to a kernel in node N1 (represented by circle 41 and referred to as kernel N1), a kernel in node N2 (represented by circle 42 and referred to as kernel N2), a kernel in node N3 (represented by circle 43 and referred to as kernel N3), a kernel in node 4 (represented by circle 44 and referred to as kernel N4), a kernel in node N5 (represented by circle 45 and referred to as kernel N5), and a kernel in node N6 (represented by circle 36 and referred to as kernel N6). The child kernel waits for a specified time to receive a login acknowledgement (step 110).

All kernels listen for login broadcast messages on the network (step 116). If a login broadcast is received (step 117), the parent kernel determines whether the kernel that sent the message is its child (step 118). If the originating kernel is not its child, the parent continues listening for login broadcasts (step 116). However, if the originating kernel is its child, the parent checks if this kernel is a duplicate child (step 119). If this is a duplicate child, the parent informs its duplicate children of a role conflict (step 120). If not, the parent sends a login acknowledgement to its child kernel (step 121).

In FIG. 7, parent kernel N4 receives kernel N7's login broadcast message a, and sends a login acknowledgement message represented by line b to kernel N7.

If a login acknowledgement is received (step 110), the child kernel sends a login confirmation to the first parent kernel that sends a login acknowledgement (step 114). The child kernel ignores any other login acknowledgements it may receive. After sending the login confirmation to its parent, the child kernel begins the Monitor process with its new parent (step 115). If the parent kernel receives the login confirmation (step 122), the parent kernel registers the child (step 123) and begins the Monitor process with its new child (step 124). If the parent kernel does not receive the login confirmation from the child (step 122), the parent kernel continues to Listen for login broadcasts (step 116).

In FIG. 7, after receiving parent kernel N4's login acknowledgement b, child kernel N7 sends a login confirmation message represented by line c to kernel N4 and begins the monitor process with its parent kernel N4.

If no parent kernel sends a login acknowledgement to the child, the child kernel begins the Login process again (step 101) unless the retry threshold has been exceeded (step 111). If the retry threshold has been exceeded, the child checks its MaxStatus setting (step 112). If the child's MaxStatus is greater than MinLevel, the child begins the Role Call process to assume the role of its own parent. Otherwise, the child kernel will enter the Login wait period again (step 101).

Role Call

Role Call is a procedure by which a kernel queries the network to find out vacancies in the name space hierarchy.

The procedure is executed by all kernels who have been configured with MaxStatus greater than MinLevel. The Role Call procedure is invoked by a kernel upon startup and subsequently when there is a managerial vacancy in its namespace. The Role Call algorithm is designed to minimize the number of kernels simultaneously participating in the Role Call process, reducing network-wide broadcasts as well as possible collisions between potential contenders for the same vacancy.

Figure 8:
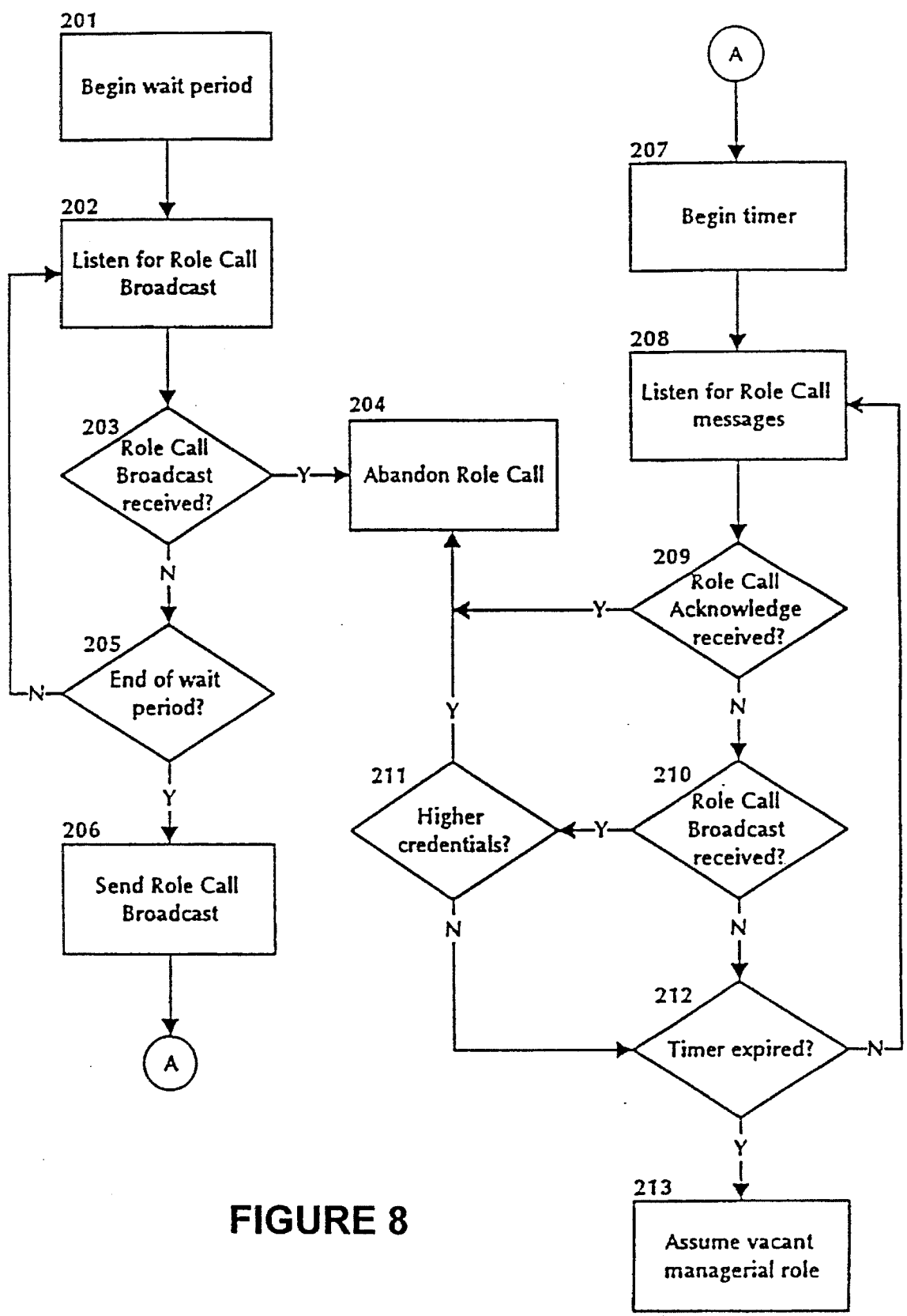
FIG. 8 is a flow chart of a roll call procedure in accordance with the present invention.

The roll call procedure is shown in FIG. 8. A kernel wishing to participate in Role Call goes through a forced wait period (step 201). The wait period is a function of the number of roles the kernel has already assumed, whether the kernel is an active context bridge, and the current state of the kernel. A random wait interval is also added to the equation.

During the wait period, the kernel listens for role call broadcasts from other kernels (step 202). If a role call broadcast is received for the same level of the hierarchy (step 203), the kernel abandons the Role Call procedure (step 204). If a role call broadcast is not received, the kernel continues to listen for role call broadcasts (step 202) until the end of the wait period (step 205). At the end of the wait period, the kernel sends its own role call broadcast on the network (step 206). The broadcast message contains the level of the hierarchy for which the role call is being requested. After sending the role call broadcast, the kernel starts a timer (step 207) and listens for role call messages on the network (step 208). A kernel that is a manager of the namespace for which role call is requested will respond with a point-to-point role call acknowledgement message. If the kernel initiating the role call receives the acknowledgement (step 209), the kernel will abandon the Role Call procedure (step 204). If the kernel initiating the role call instead receives another role call broadcast for the same level of the hierarchy (step 210), the kernel reads the message. If the originator of the message has higher credentials (step 211), the kernel will abandon the Role Call procedure (step 204). The credentials of a particular kernel are a function of the number of roles the kernel has already assumed, whether the kernel is an active context bridge, and the current state of the kernel. At the end of the timeout period (step 212), the kernel assumes the vacant managerial role for which it requested role call (step 213).

Figure 9:
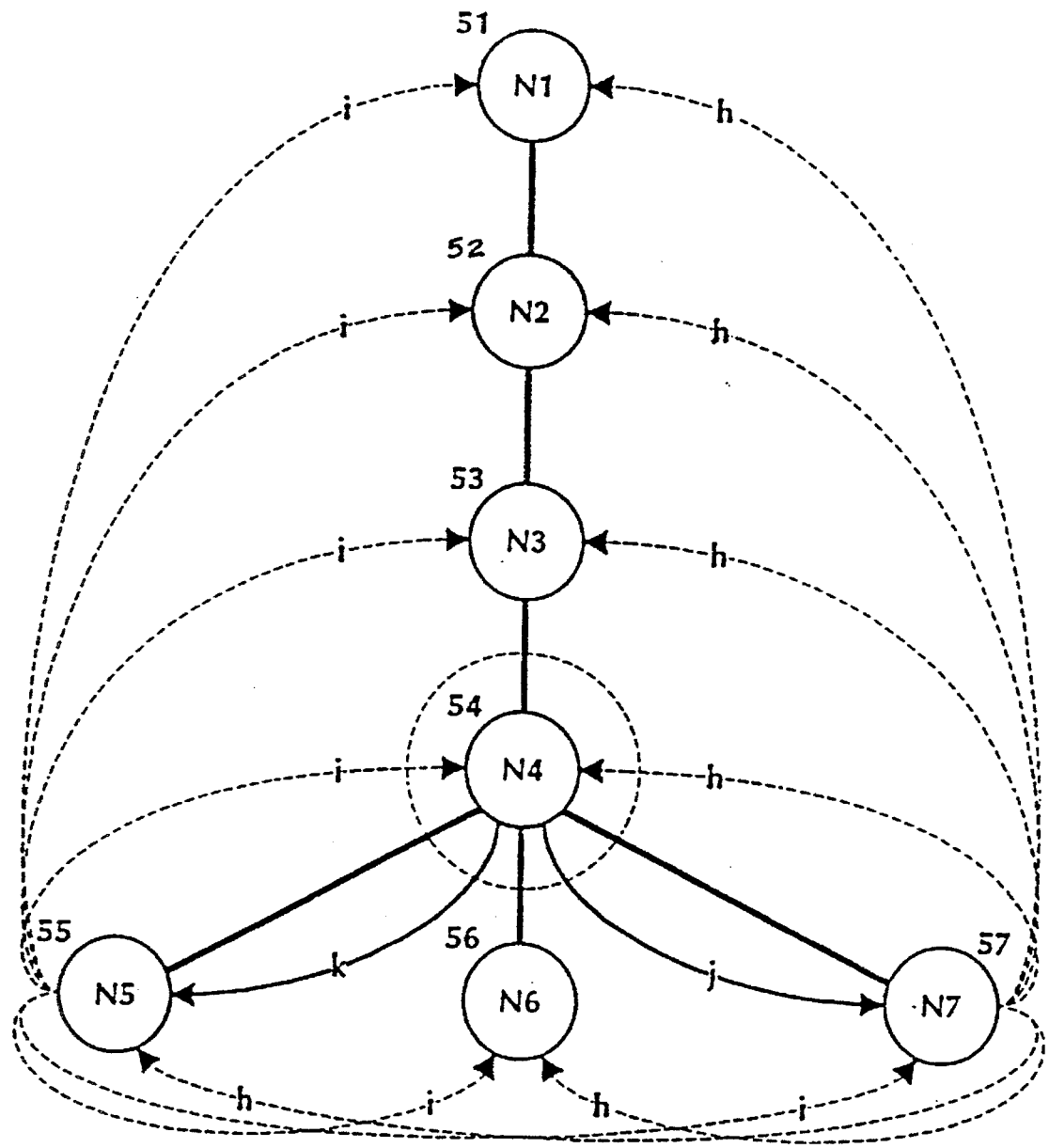
FIG. 9 is a diagram showing the roll call communication between different nodes in accordance with the present invention.

FIG. 9 depicts an example of the Role Call procedure. Kernel N4, represented by circle 54, 57 and 55 becomes isolated from the network due to physical connection problems. Kernel N7, represented by circle 54, 57 and 55 detects the absence of kernel N4 as a result of its Monitor process (described in detail below) with its parent kernel N4. Kernel N7 goes into the forced wait period and listens for role call broadcast traffic on the network. If kernel N5, represented by circle 54, 57 and 55 had started its Role Call process before kernel N7, kernel N7 would abort its Role Call after receiving kernel N5's role call broadcast message, represented by dotted line i. However, assuming that kernel N7 started its Role Call first, kernel N7 sends out its broadcast message, represented by dotted line h, at the end of the role call wait period.

If kernel N5 sends its own role call broadcast message after kernel N7 has already done so, kernel N7 compares its credentials with those of kernel N5. If kernel N5's credentials are higher, kernel N7 abandons Role Call and kernel N5 assumes the managerial role left vacant by the disappearance of kernel N4. If kernel N7's credentials are higher, kernel N5 abandons Role Call and kernel N7 assumes kernel N4's vacant managerial role at the end of the timeout period.

If kernel N4 has reappeared on the network and has received kernel N5's broadcast message i or kernel N7's broadcast message h, kernel N4 responds by sending an acknowledgement message to kernel N5, represented by line j, or to kernel N7, represented by line k. If kernel N4 has not reappeared on the network, kernel N5 and kernel N7 continue their Role Call processes.

Monitor

Figure 10:
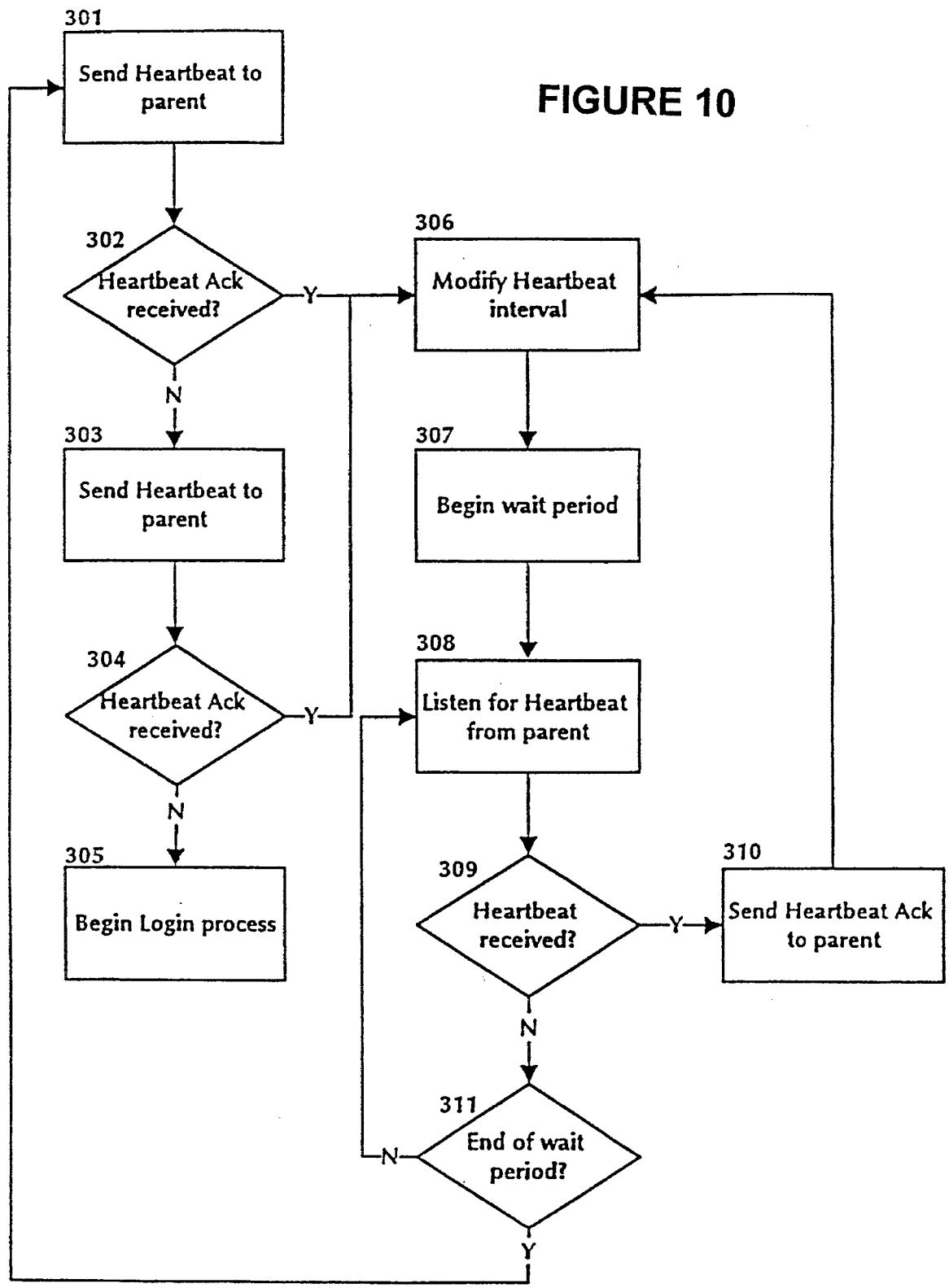
FIG. 10 is a flow chart of a child monitor procedure in accordance with the present invention.
Figure 11:
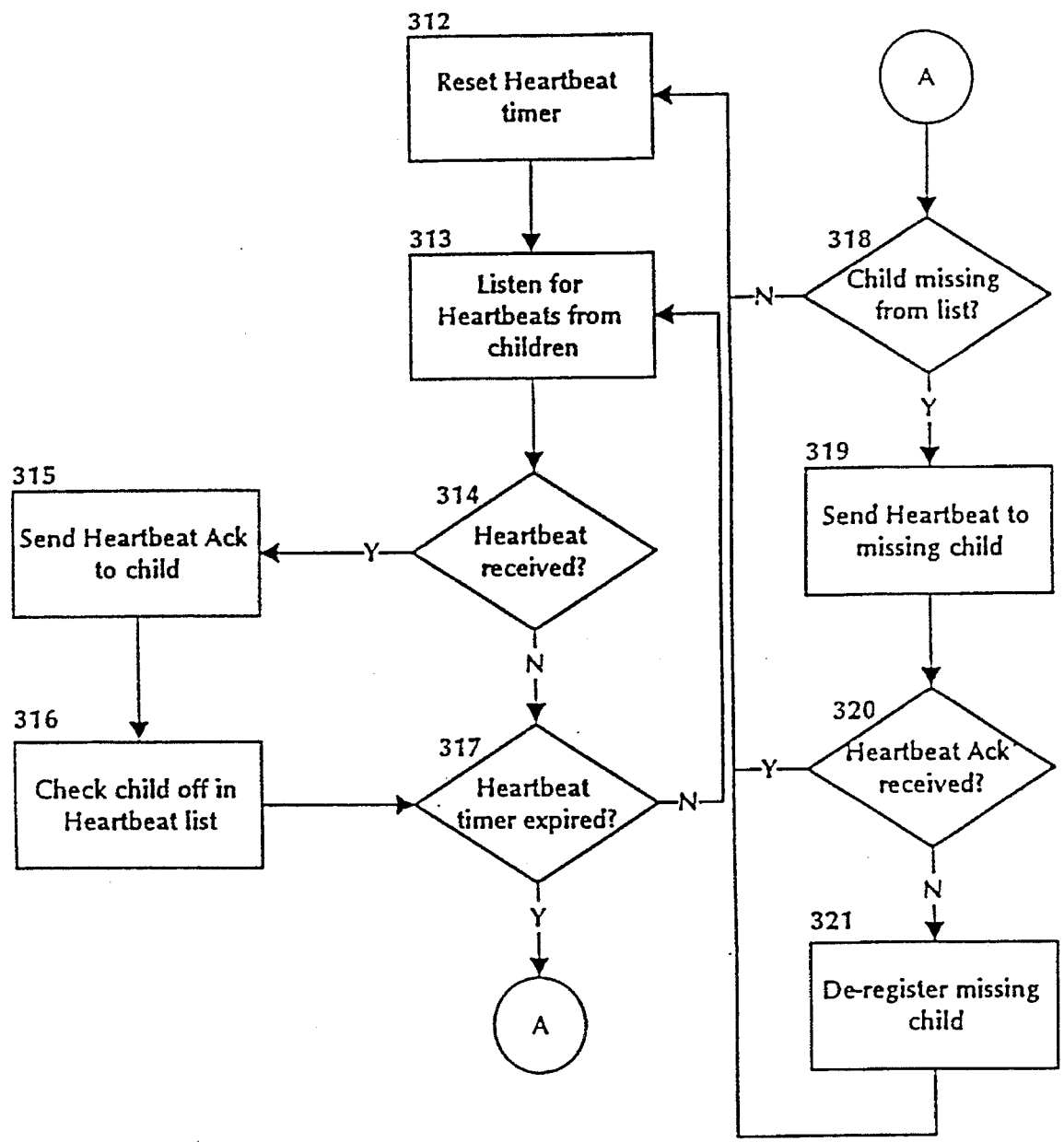
FIG. 11 is a flow chart of a parent monitor procedure in accordance with the present invention.

FIGS. 10 and 11 depicts the child and parent Monitor processes, which is used to keep track of one another.

The parent has its own "heartbeat" timer set to the slowest heartbeat interval of all of its children. The parent initially resets its heartbeat timer at the beginning of the Monitor process (step 312) and listens for heartbeat messages from its children (step 313). A child participating in the Monitor process with its parent first sends a heartbeat message to its parent (step 301) and waits for an acknowledgement. If a heartbeat message is received by the parent (step 314), the parent will send a heartbeat acknowledgement to the child (step 315) and check off the child in its list of children (step 316). The acknowledgement message contains a heartbeat offset value to scatter the heartbeat intervals among its children. If the child receives the heartbeat acknowledgement (step 302), the child modifies its heartbeat interval (step 306) and enters a wait period (step 307). If the child does not receive a heartbeat acknowledgement, it sends another heartbeat message to its parent (step 303). If a heartbeat acknowledgement is received (step 304) at this time, the child then modifies its heartbeat interval (step 306) and enters the wait period (step 307). If the child still does not receive a heartbeat acknowledgement, the child assumes that it has become orphaned and begins the Login process (step 305).

When the parent's heartbeat timer expires (step 317), the parent checks its list of children for missing heartbeat messages (step 318). If the parent detects a missing heartbeat, the parent sends a heartbeat message to the missing child (step 319). If the parent does not receive a heartbeat acknowledgement from the missing child (step 320), the parent de-registers the child (step 321).

During its wait period (step 307), the child listens for a heartbeat message from its parent (step 308). If a heartbeat message is received by the child (step 309), the child sends a heartbeat acknowledgement to its parent (step 310), modifies its heartbeat interval (step 306), and enters the wait period again (step 307). At the end of the wait period (step 311), the child begins the Monitor process once again (step 301).

Figure 12:
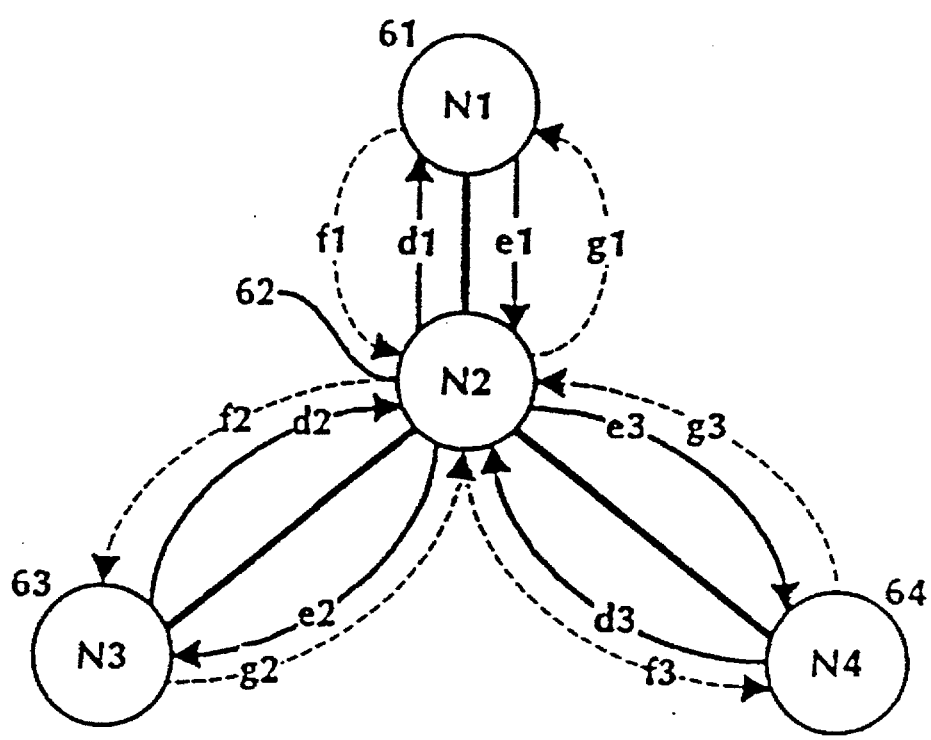
FIG. 12 is a diagram showing the "heartbeats" monitor communication between different nodes in accordance with the present invention.

FIG. 12 shows the periodic check-in messages, or "heartbeats," passed between the parent and child during the Monitor process. In FIG. 12, kernels N3 and N4 (represented by circles 63, 64, 62 and 61, respectively) are the child of kernel N2 (represented by circle 52). Kernel N2 is in turn the child of kernel N1 (represented by circle 63, 64, 62 and 61). Messages $d_1$ through $d_3$ represent heartbeat messages from child to parent, while messages $e_1$ through $e_3$ represent heartbeat acknowledgements from parent to child. Messages $f_1$ through $f_3$ represent heartbeat messages from parent to child, while messages $g_1$ through $g_3$ represent heartbeat acknowledgements from child to parent.

Election

Figure 13:
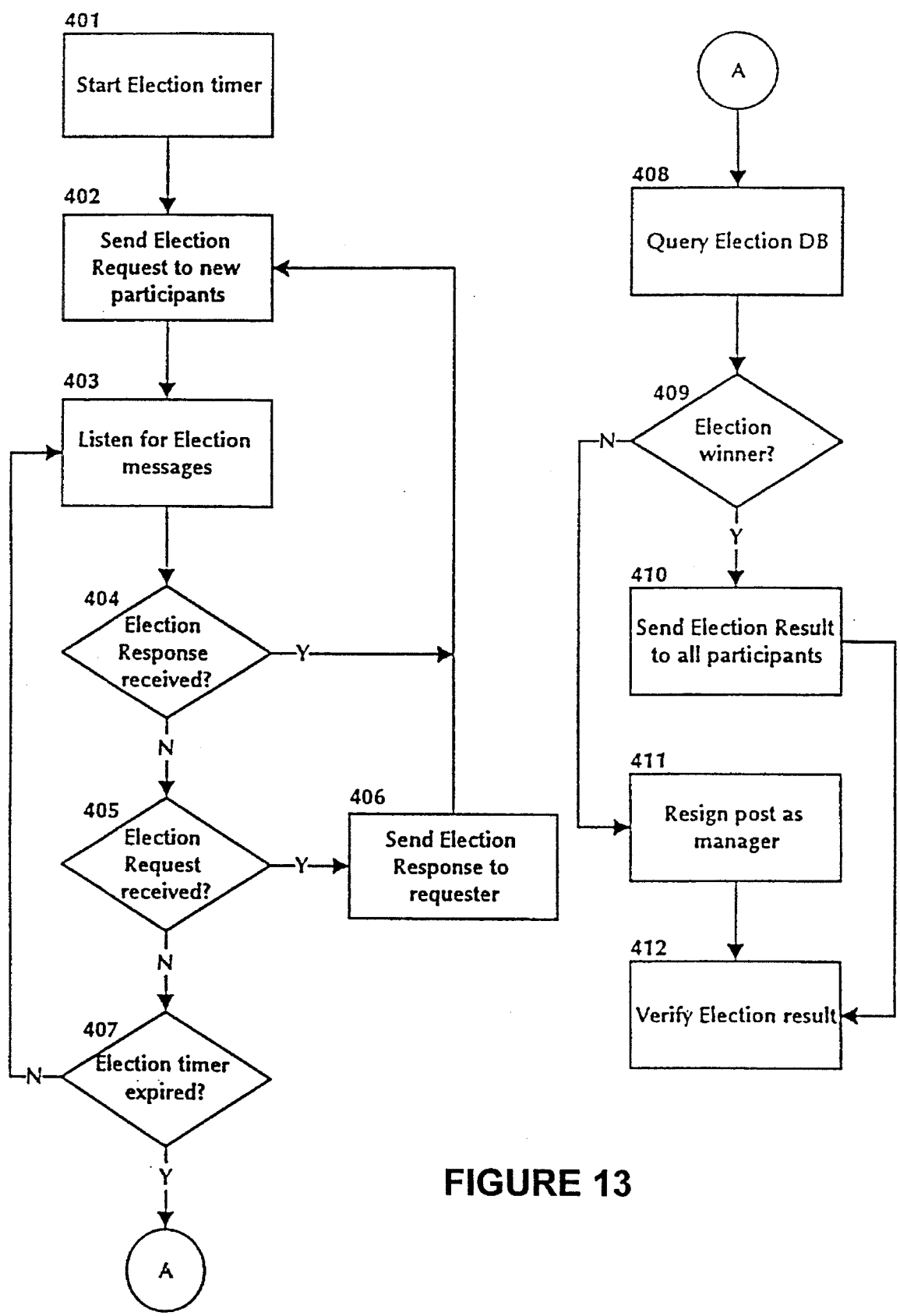
FIG. 13 is a flow chart of an election process in accordance with the present invention.

PIPES kernels engage in a distributed Election (FIG. 13) to determine the winner when role conflicts arise. Two or more managers may claim managerial responsibility over the same namespace when there are problems in the underlying physical connections that cause fragmentation of the network. Collisions in the namespace are primarily detected through either role call or login broadcasts, described above. When a kernel detects a namespace collision, it will inform the principals that in turn execute the Election process. New participants may join an Election that is already in progress. Because the Election is fully distributed, each kernel separately conducts the Election and arrives at the result.

When a kernel detects a role conflict or is informed of one, the kernel begins the Election process by starting an election timer and opening an election database (step 401). The kernel stores the election participants known so far, and sends an election request to each one (step 402). This message consists of all known kernels that are participating in the election. The kernel then listens for any election traffic on the network (step 403). If the kernel receives an election response (step 404), which contains a list of known participants, the kernel stores any new election participants in the database and sends each one an election request (step 402). If another election request is received (step 405), the kernel sends an election response to the originator (step 406), updates the election database, and sends election requests to the new participants (step 402). When the election timer expires (step 407), the kernel queries its election database to determine the winner (step 408). The winner of an election depends on the number of roles each participating kernel has already assumed, whether the participating kernels are active context bridges, and the current state of each kernel. If the kernel is the winner of the election (step 409), the kernel sends an election result message to all election participants (step 410). If the kernel loses the election, the kernel will resign its post as manager (step 411), informing all of its children of their new parent. All participants in the election verify the election result and finally close their election databases (step 412).

Figure 14:
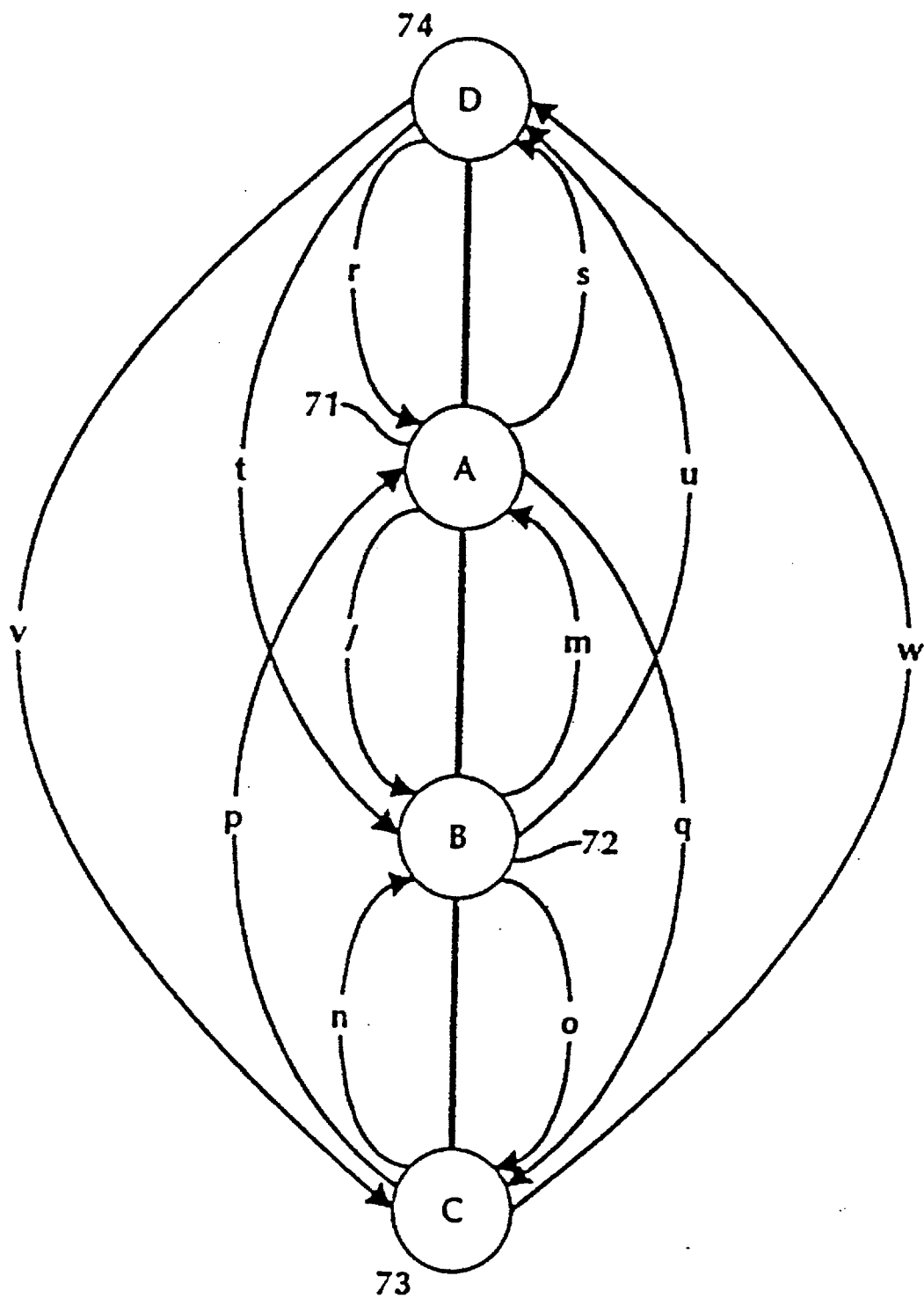
FIG. 14 is a diagram showing the election communication between different nodes in accordance with the present invention.

FIG. 14 illustrates an example of the Election process. Suppose that kernels A and B (represented by circles 71 and 72, respectively) have detected role conflicts independently. Kernel A will send an election request message (arrow l) to kernel B. This message will consist of participants known to kernel A, at this point being just kernels A and B. When kernel B receives this message, kernel B will send kernel A an election response message (arrow m). Later, kernel C detects a role conflict with kernel B. Kernel C will then send an election request message (arrow n) to kernel B. Kernel B will update its election database with the new entrant kernel C and will send an election response message (arrow o) back to kernel C. This message will contain the election participants known to kernel B at this point, namely, kernels A, B, and C. When kernel C receives this message, it will detect the new contestant kernel A, update its election database, and send an election request message (arrow p) to kernel A. At this point, kernel A will become aware of the new contestant (from its perspective), update its database with kernel C's credentials, and respond to kernel C's request (arrow q). In the same fashion, when kernel D enters the election only aware of kernel A, it will soon be aware of kernels B and C.

Logout

Logout (FIGS. 15 & 16) is a procedure by which a kernel de-registers from its patent. Logout may be initiated as part of the kernel shutdown logic, or as a result of resigning as a manager of a particular level of the hierarchy. A child kernel (shown as kernel N2 in FIG. 16) sends a logout request (represented by arrow x) to its parent, shown as kernel N1 in FIG. 16 (step 501). When the parent receives the logout request from its child (step 506), it sends a logout acknowledgement (shown as arrow y in FIG. 16) to the child (step 507) and de-registers the child (step 508). If the child is a manager (step 503), the child will send messages (represented by messages $z_1$ through $z_3$ in FIG. 16) inform all of its children (i.e., kernels N3, N4, and N5 in FIG. 16) that it is no longer their parent (step 504). In addition, the parent kernel will nominate a successor from among its children by nominating the winner of an election process which it performs on its children (step 505).

Resource Layer

The Resource Layer (block 32 in FIG. 3) is responsible for managing all of the resources distributed throughout the PIPES network hierarchy. A resource is a functional subset of a PIPES application that is made available to other PIPES applications executing at other nodes on the network. A PIPES resource can be thought of as a well-defined service element, where one or more elements, when considered as a whole, combine to form a complete service.

Figure 17:
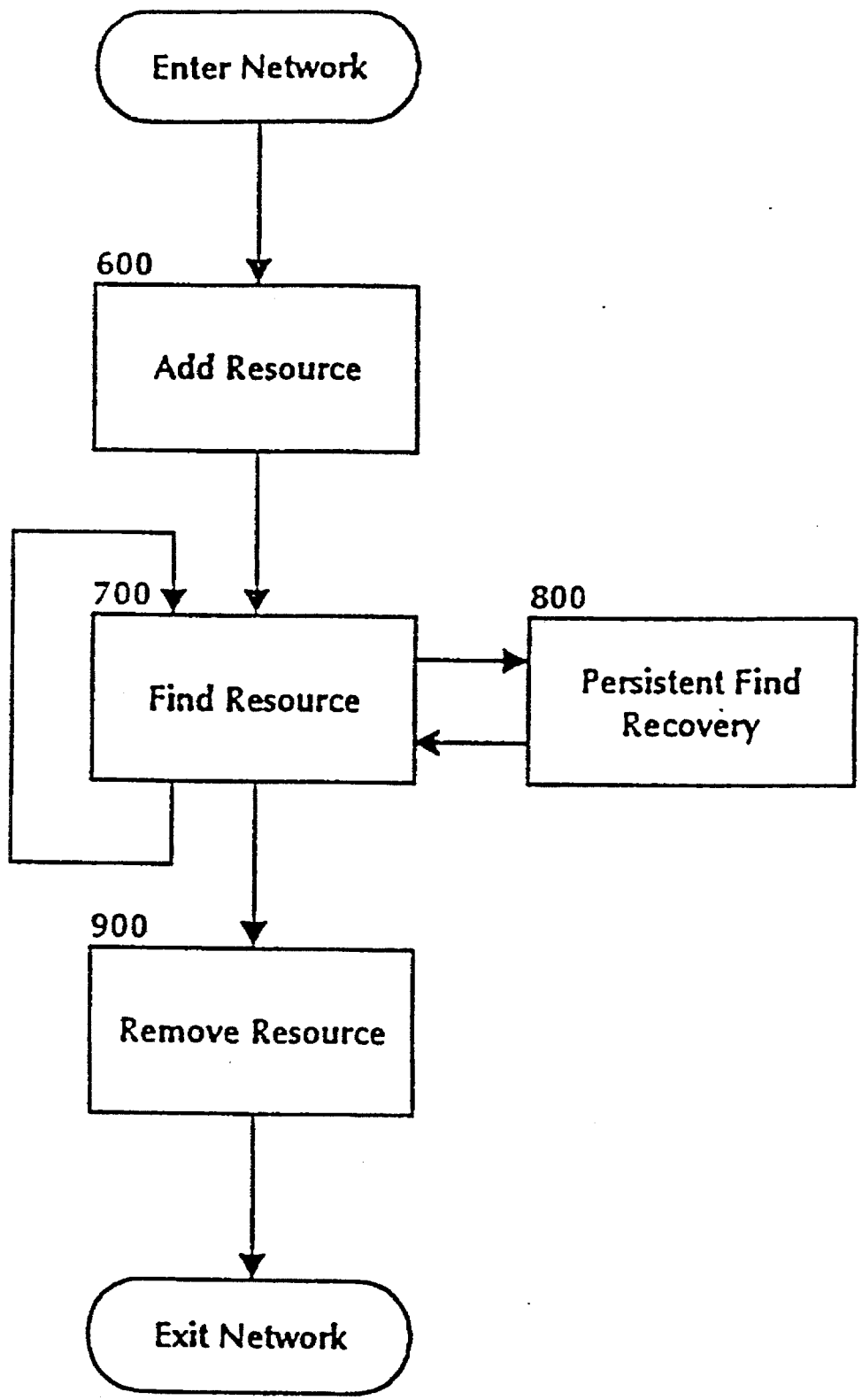
FIG. 17 is a diagram showing activities relating to a resource of the present invention.

FIG. 17 describes the life cycle of a resource in PIPES. A resource enters the network through the Add Resource process (block 600). In order to utilize the services provided by a resource, an application must execute the Find Resource Process (block 700) to determine its location within the PIPES address space. For example, after executing a Find Query and obtaining the address of an available resource, an application might attempt to establish a session with the resource through Session Services 35.

If a resource is not available at the time an application executes a Find Query, the application might alternatively execute a Persistent Find Query, which will notify the application of a resource's availability as soon as a resource meeting the search criteria enters the network through the Add Resource Process. In this case, Area Managers in PIPES maintain caches of pending Persistent Find Queries to facilitate an immediate response to such a query. If an Area Manager were to become disconnected from the rest of the PIPES hierarchy through a physical network failure, a recovery mechanism (block 800) is employed to recreate the persistent find cache at the new Area Manager that takes over the disconnected manager's responsibilities.

During its lifetime on the network, a resource is available to provide services to applications on the network. If the application that owns the resource removes the resource from the network, the Resource Layer executes the Remove Resource process (block 900).

Add Resource Process

Figure 18:
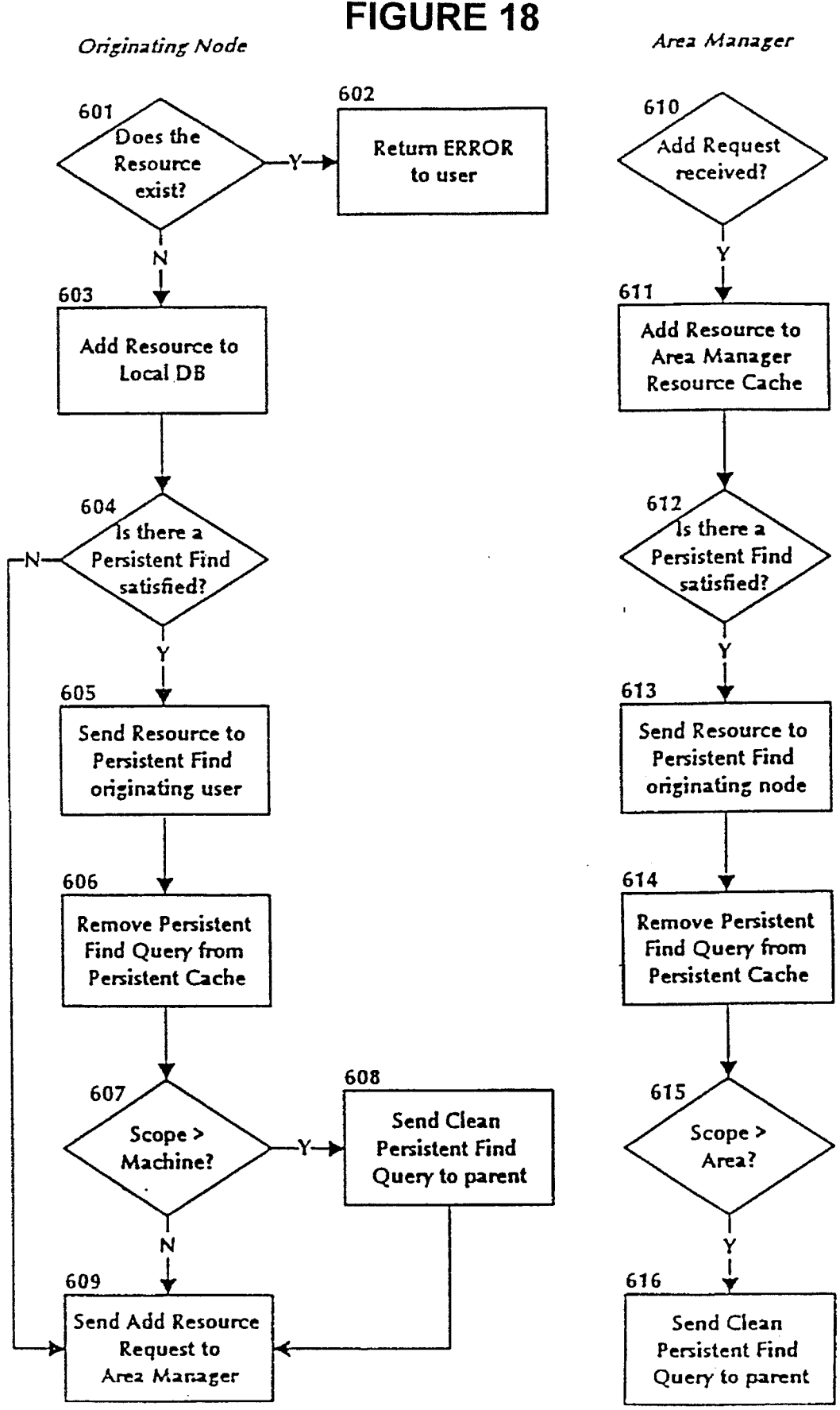
FIG. 18 is a flow chart of an "Add Resource" process in accordance with the present invention.

FIG. 18 illustrates the Add Resource process which is used to introduce an application's resource into PLN 33. The node at which the resource originates first checks its local resource database to determine whether a resource with the same name already exists (step 601). If such a resource does exist, the originating node returns an ERROR to the user's application (step 602). If the resource does not exist, the originating node adds an entry for the resource in its local database (step 603). The resource then checks its persistent find query cache to determine whether an application executing at the node is waiting for a resource (step 604). If the new resource matches any of the search criteria in the persistent find cache, then the originating node sends the new resource's attributes to the originating user's application that initiated the Persistent Find Query (step 605). The originating node then removes from the cache the Persistent Find Query for which the new resource matched the search criteria (step 606). If the scope of the newly removed persistent find query is greater than machine level (step 607), then the originating node sends a Clean Persistent Find Query to its parent node (step 608). At the end of the Persistent Find processing, or if no Persistent Find Query was matched by the new resource, the originating node sends an add resource request to its parent Area Manager (step 609).

If an Area Manager receives an add resource request from one of its children (step 610), the Area Manager adds the resource to its own separate resource cache (step 611). The Area Manager then checks its own persistent find cache to determine whether the new resource matches any of the criteria of a query in the cache (step 612). If so, the Area Manager sends the resource's attributes to the node that originated the Persistent Find Query (step 613) and removes the Query from its persistent find cache (step 614). If the scope of that Query is greater than area level (step 615), then the Area Manager sends a Clean Persistent Find Query to its parent Group Manager (step 616).

Find Resource Process

An application searching for a resource within the PLN 33 may specify one of three different options for the Find Query which it sends to the PIPES Kernel: Find, Find Next, or Persistent Find. A Find Query will begin searching for resources at the local machine, moving to the area level if no resources are found at the machine level. If no resources are found at the area level, the search continues at the group level, and so on up the PIPES network hierarchy. If a resource is found at a particular level, that resource's attributes are sent to the application requesting the resource. If the application later issues a Find Next Query, the search will continue where the previous search had left off within the PIPES hierarchy.

If the user issues a Persistent Find Query, the originating node first converts it into a regular Find Query, which travels the network just like any other Find Query. If any resource is returned to the user, the Find Query will not persist within the network; however, if no resource is found within the PIPES hierarchy, the Persistent Find Query is stored within the PIPES hierarchy in the Area Managers' persistent find caches.

Figure 19:
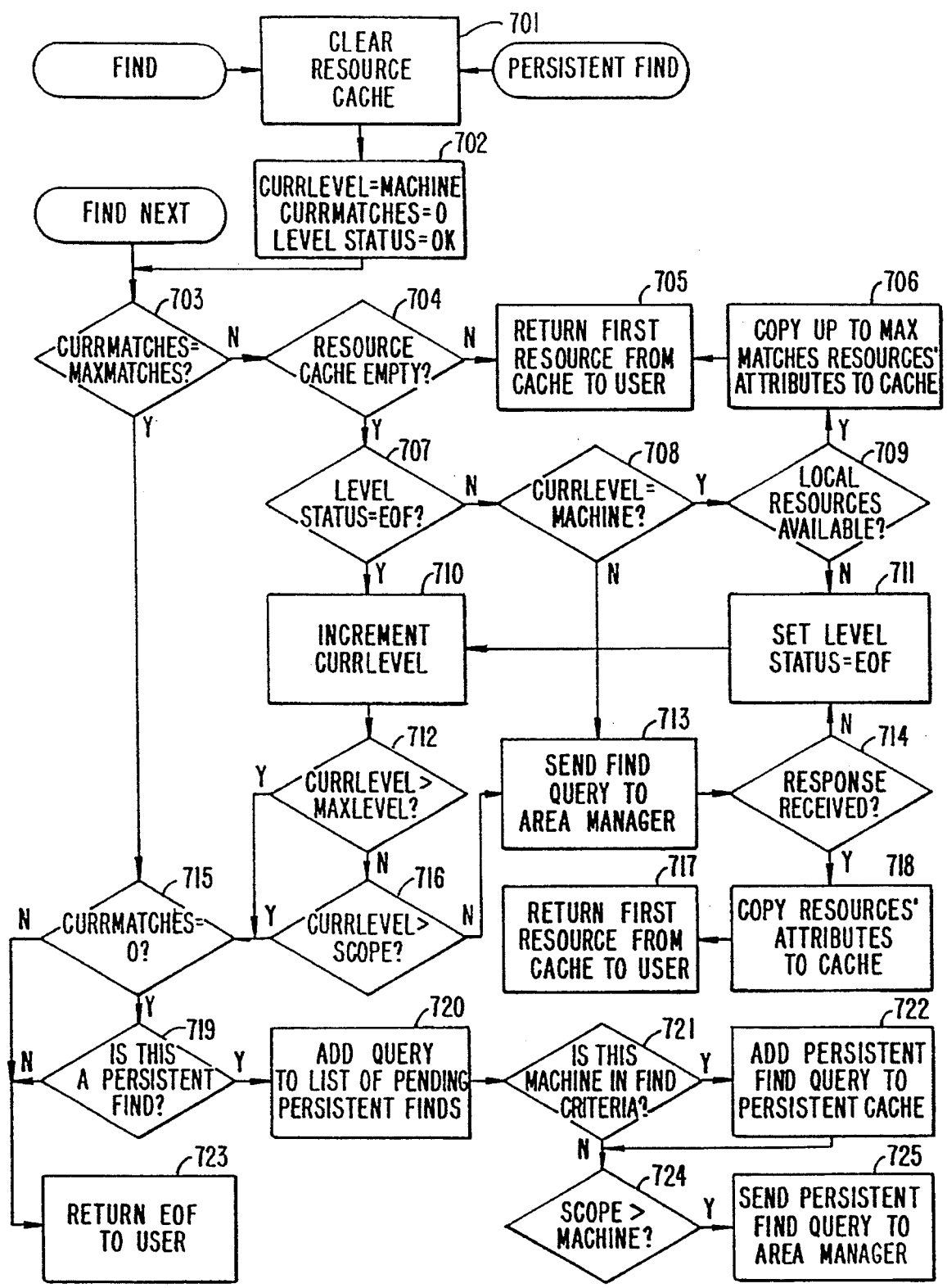
FIG. 19 is a flow chart of a "Find Resource" process in accordance with the present invention.

FIG. 19 depicts the Find Resource process as it executes at the originating node. If a Find or Persistent Find Query is initiated, the originating node clears a resource cache which is used as a buffer to store the resource attributes satisfying the query's search criteria (step 701). Because a Find Query is completely coordinated by the originator of the query, and no state is maintained at any of the intermediate nodes, each query data packet must carry sufficient information to enable the intermediate nodes to conduct their searches. Some of the most important pieces of information is the originating node's location within the network, the maximum number of matches that is desired by the originating node (Max-Matches), the current number of matches that have been returned to the originating node (CurrMatches), the scope of the search (Scope), the level at which the search was last conducted (Level), and the status of the last search at that level (Level Status). When the search begins with a Find Query or a Persistent Find Query, the originating node initializes some of these variables to begin the search at the machine level (step 702). Because a Find Next Query is designed to begin the next search where the previous search left off, a Find Next Query causes the originating node to skip these initialization steps.

The originating node compares CurrMatches to MaxMatches to determine whether the user has already received the maximum number of matches for which it asked (step 703). If CurrMatches is not equal to MaxMatches (CurrMatches can never exceed MaxMatches), then the originating node checks its resource to see if any more resources are available to return to the user (step 704). Resources may be left over in the local cache because although a distributed Find Query may return more than one resource to the originating node, the originating node returns resources to the user one at a time. If there are resources left in the local cache, the originating node returns the fast resource to the user (step 705). If the resource cache is empty, the originating node checks the Level Status to determine where the last search left off (step 707). Level Status is set to EOF (i.e., end of find) if there are no resources available at that level. If the Level Status is EOF, the originating node increments CurrLevel to continue the search at the next level of the hierarchy (step 710). If the Level Status is not EOF, the originating node checks CurrLevel to determine whether to begin the search at the local machine before beginning a distributed search (step 708). If CurrLevel is set to Machine, the originating node searches its local resource database to see if local resource may match the search criteria (step 709). If a local resource is available, the originating node copies up to MaxMatches resources' attributes to the query's resource cache, and sets CurrMatches to the number of matches found and copied to the cache (step 706). The originating node then returns the first resource from the cache to the user that requested the resource (step 705). If no local resources are found, the originating node sets the Level Status to EOF (step 711), and then increments CurrLevel to continue the search at the next level (step 707).

If CurrLevel exceeds MaxLevel (step 712) or Scope (step 716), then search has either worked its way through the complete PIPES hierarchy or exceeded the scope of the original query. Thus, if either of these conditions have been met, the search is complete. If not, the originating node sends the Find Query to its parent, the Area Manager to begin the distributed search (step 713). If resources' attributes are returned in response (step 714), the originating node copies the resources' attributes to the query's resource cache (step 718) and returns the fast to the user (step 717). If the search completes unsuccessfully, the originating node checks CurrMatches to see if any resources have been returned to the user (step 715). If CurrMatches is greater than zero, then the user has received all of its resources, and the originating node returns an EOF to the user (step 723). If CurrMatches is zero, and no resources were found on the network, the originating node distributes a Persistent Find Query if the user has so specified (step 719). This entails adding the query to a listing of Persistent Find Queries pending at the node in order to keep track of the sources of the Persistent Find Queries (step 720). If a resource existing at the local machine could possibly match the search criteria of the Query (step 721), the originating node adds the query to its persistent find cache (step 722), which is used to keep track of the search criteria so that resources that meet those criteria may be returned as soon as they are added to PIPES. If the scope of the query is greater than machine level (step 724), then the Persistent Find Query is send to the Area Manager (step 725).

Figure 20:
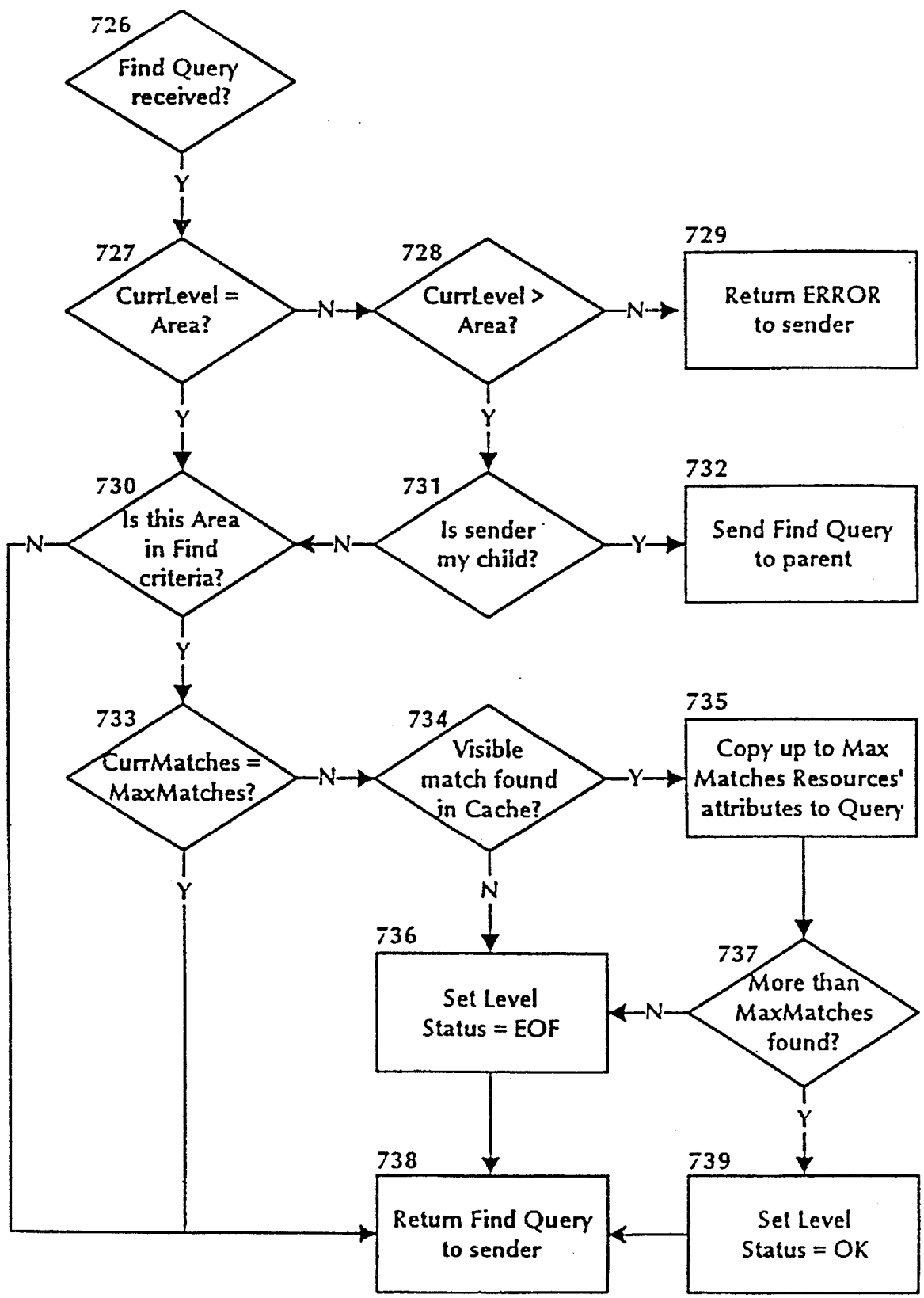
FIG. 20 is a flow chart of a "Find Resource" process at an area manager node of the present invention.
Figure 21:
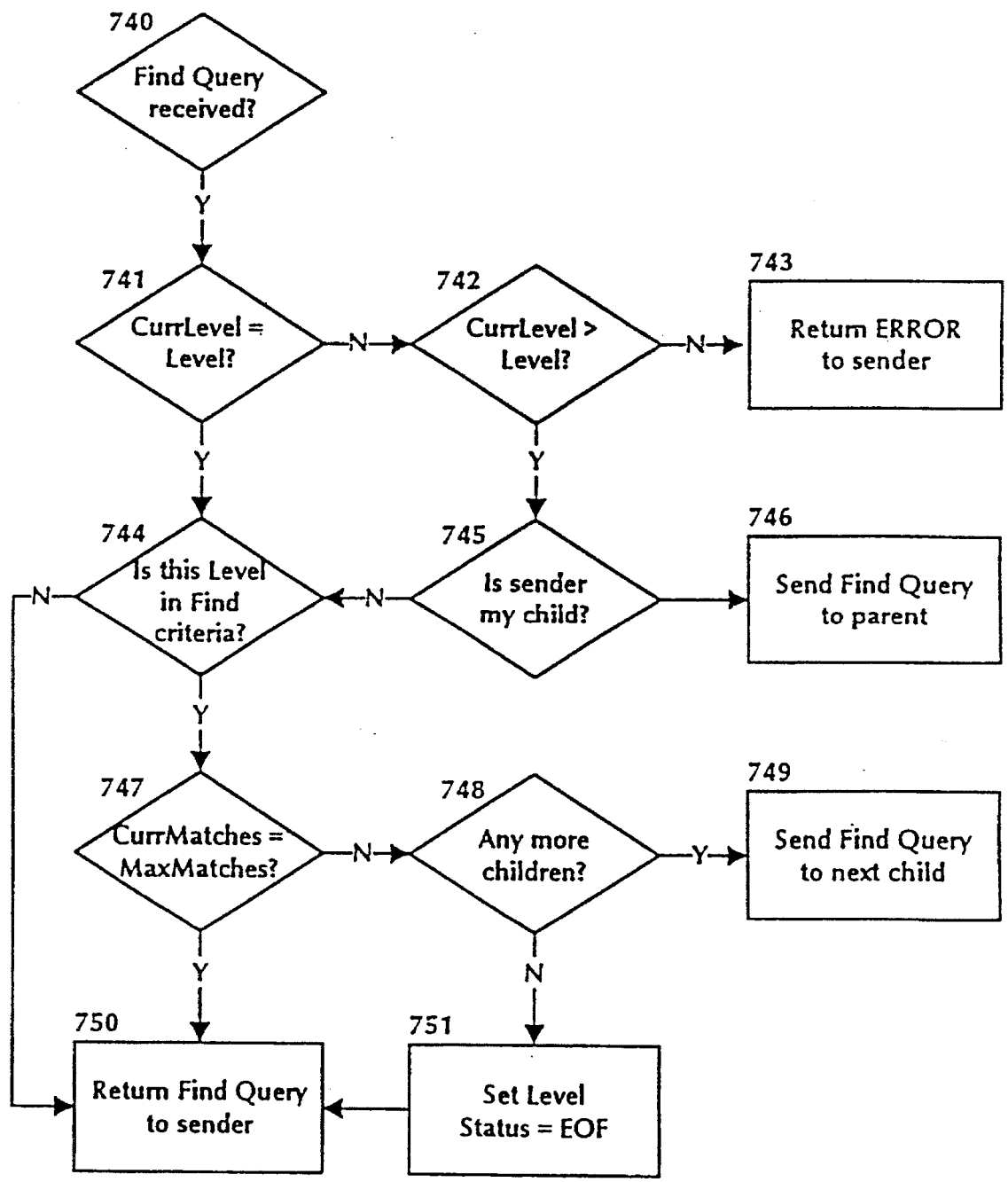
FIG. 21 is a flow chart of a "Find Resource" process in accordance with the present invention at a level above area manager.

FIGS. 20 and 21 illustrate how the Resource Layer routes a Find Query throughout PLN 33. FIG. 20 shows the process which is executed at the Area Manager level. When the Area Manager receives a Find Query (step 726), the Area Manager checks CurrLevel to determine the level at which a search is requested (step 727). If CurrLevel is less than Area (step 728), then the Area Manager returns an error to the node that sent the Find Query because the Area Manager received the query by mistake (step 729). If CurrLevel is greater than Area (step 728), the Area Manager will forward the Find Query to its parent (step 732) if the Area Manager received the Find Query from one of its children (step 731). Thus, the Area Manager is just passing on the Find Query because the search should continue at a higher level of the hierarchy. If the search should continue at this level, the Area Manager analyzes the search criteria to determine whether a resource in this area could satisfy the criteria (step 730). If not, the Area Manager returns the Find Query to the sender (step 738). In addition, if CurrMatches is already equal to MaxMatches (step 733), the Area Manager also returns the Find Query to the sender (step 738). Otherwise, the Area Manager searches its resource database looking for a match that is visible to the originating node (step 734). The user that adds a resource to PIPES can specify which applications can utilize its services, or its "visibility" within PIPES. If visible matches are found, a maximum of MaxMatches resources' attributes are copied to the Find Query (step 735). If more than MaxMatches resources are found (step 737), the Area Manager sets the Level Status to OK (step 739) so that the search will continue at this level the next time a Find Next Query is issued. Otherwise, the Area Manager sets the Level Status to EOF to notify the originating node that no more resources are available at this level (step 736). Finally, the Area Manager returns the Find Query to the sender (step 738).

The Find Query Process at managerial levels higher than Area Manager in the PLN hierarchy (FIG. 21) is similar to that at the Area Manager level, except that no searching occurs because only machines and Area Managers possess resources databases. Steps 740 through 747 in FIG. 21 are the same as steps 726 through 733 in FIG. 20. In each case, the node determines whether the search should continue at this level or at a higher level. In this case, a search at this level consists of forwarding the Find Query to each of the manager's children in turn. If any more children have not yet seen the Find Query (step 748), the manager sends the Find Query to the next child (step 749). When no more children are left, the manager sets the Level Status to EOF (step 751) and returns the Find Query to the sender (step 750).

Figure 22:
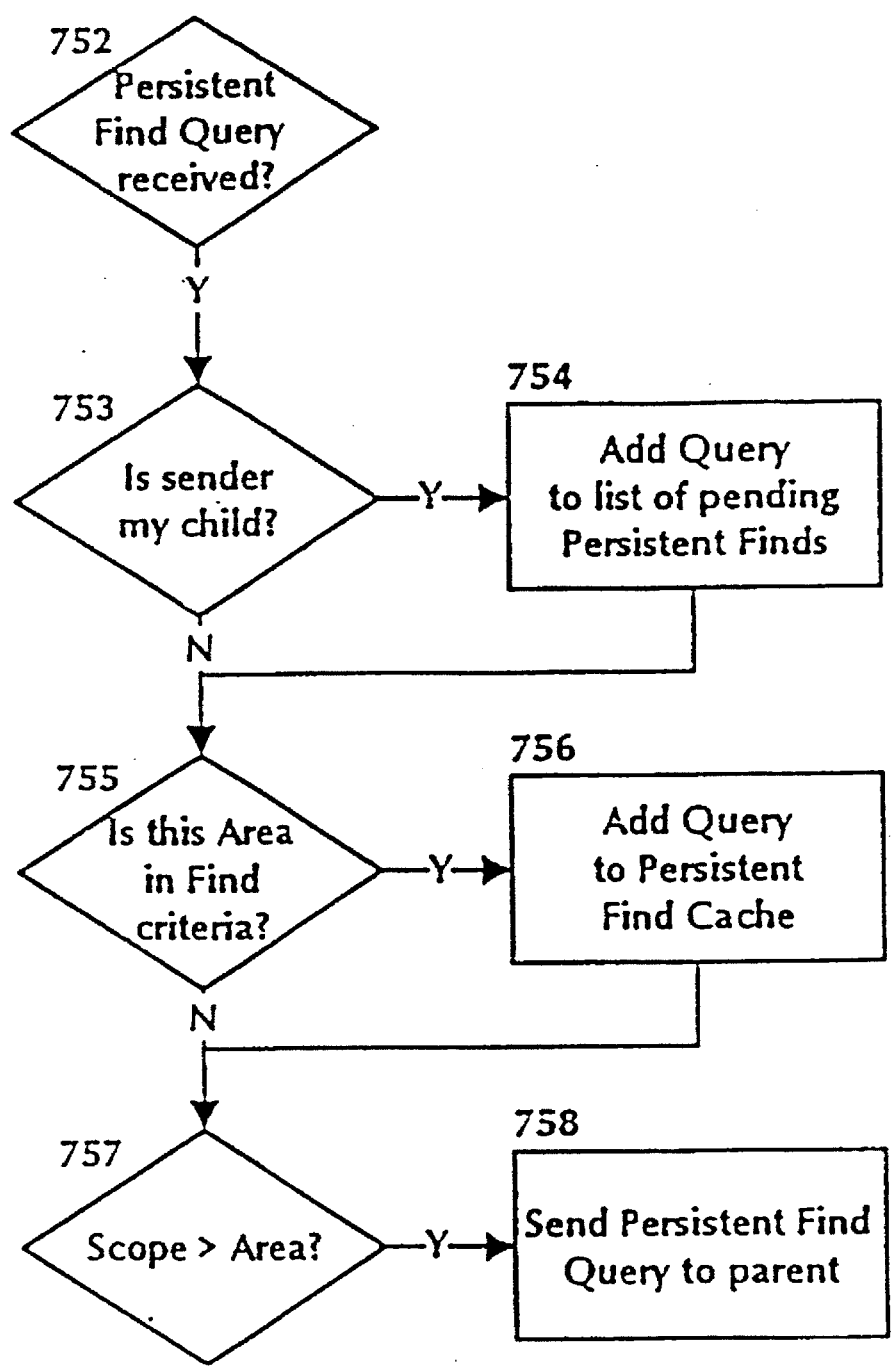
FIG. 22 is a flow chart of a "Persistent Find" process at an area manager node of the present invention.
Figure 23:
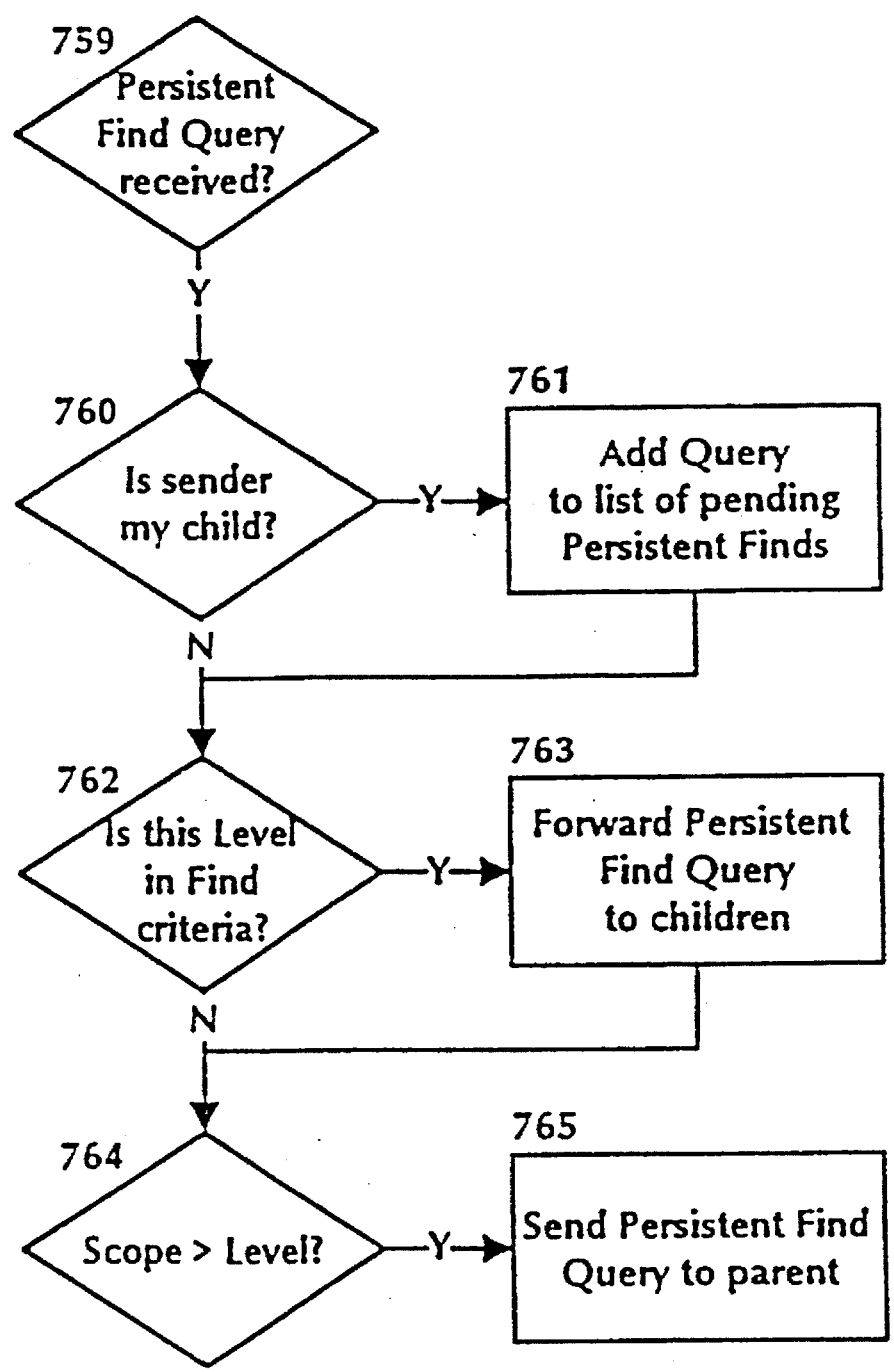
FIG. 23 is a flow chart of a "Persistent Find" process in accordance with the present invention at a level above area manager.
Figure 24:
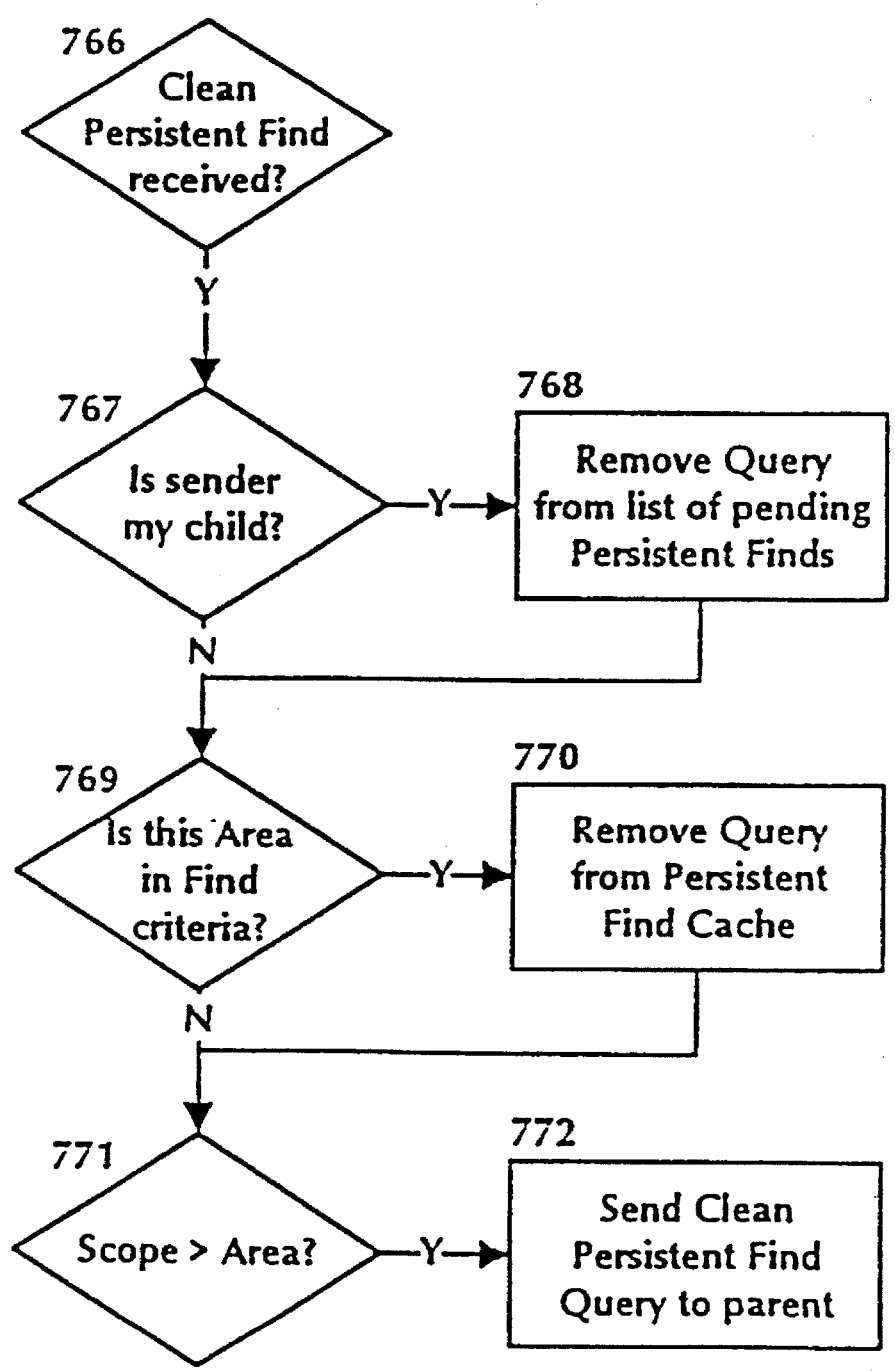
FIG. 24 is a flow chart of a "Clean Persistent Find" process at an area manager node of the present invention.
Figure 25:
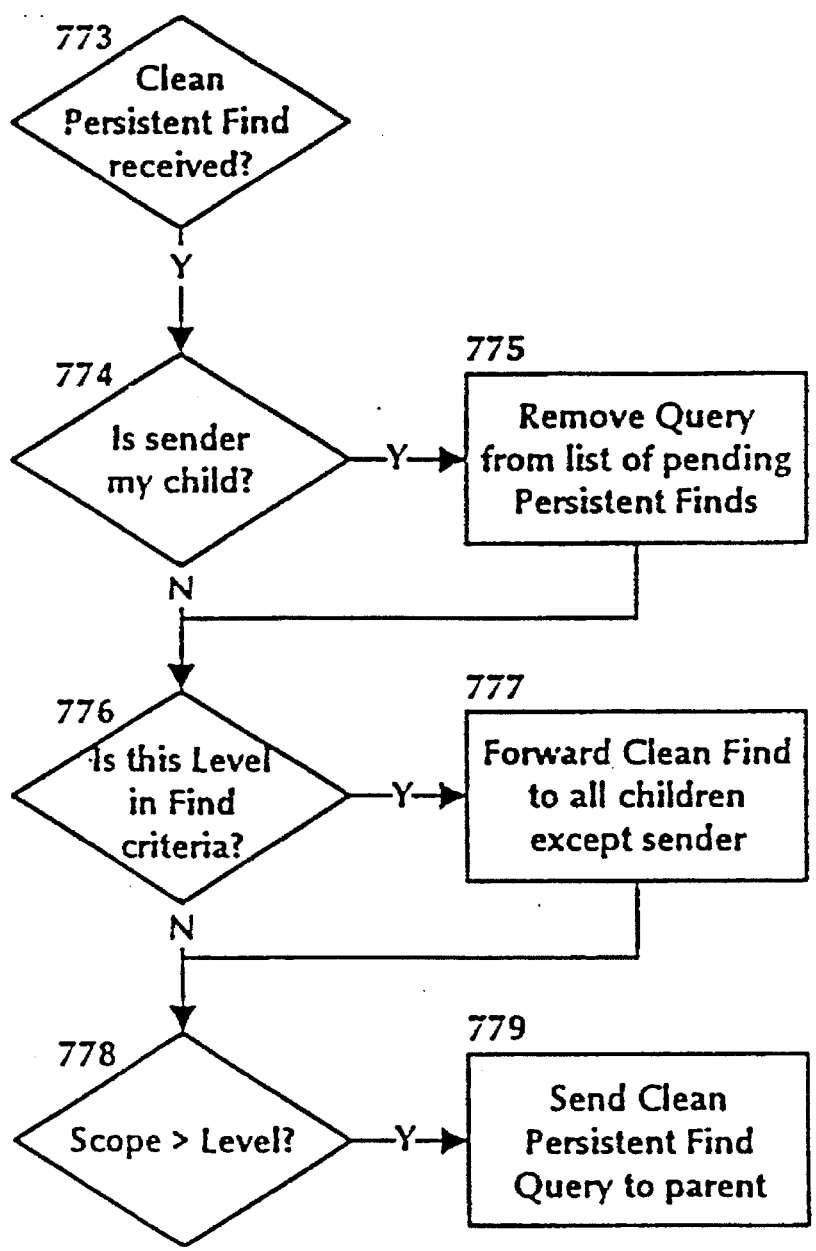
FIG. 25 is a flow chart of a "Clean Persistent Find" process in accordance with the present invention at a level above area manager.

FIGS. 22 and 23 illustrate the process of adding a Persistent Find Query throughout the network, and FIGS. 24 and 25 depict a similar "clean-up" process used to remove a Persistent Find Query from the network. In FIG. 22, an Area Manager node processes a Persistent Find Query received over PLN 33 (step 752). First, if the Area Manager received the Query from one of its children (step 753), the Area Manager adds the query to its source list of pending persistent finds (step 754). If a resource in this area could satisfy the Persistent Find Query's search criteria (step 755), then the Area Manager adds the query to its persistent find cache. If the Scope of the Query is greater than Area level (step 757), the Area Manager sends the Persistent Find Query to its parent (step 758). Similarly, in FIG. 23, a manager at a level higher than Area receives a Persistent Find Query (step 759). If the sender is one of the manager's children (step 760), the manager adds the Query to its source list of pending persistent finds (step 761). If this level is within the search criteria specified in the Query (step 762), the manager forwards the Query to its children (except possibly the child that sent the Query) (step 763). If the Scope of the Query is greater than this level (step 764), then the manager sends the Persistent Find Query to its parent (step 765).

Similar processes are illustrated in FIGS. 24 and 25 that "clean-up" Persistent Find Queries by removing them from nodes' source lists of pending persistent finds (steps 768 and 775) and removing them from Area Managers' persistent find caches (step 770).

Persistent Find Recovery Process

Figure 26:
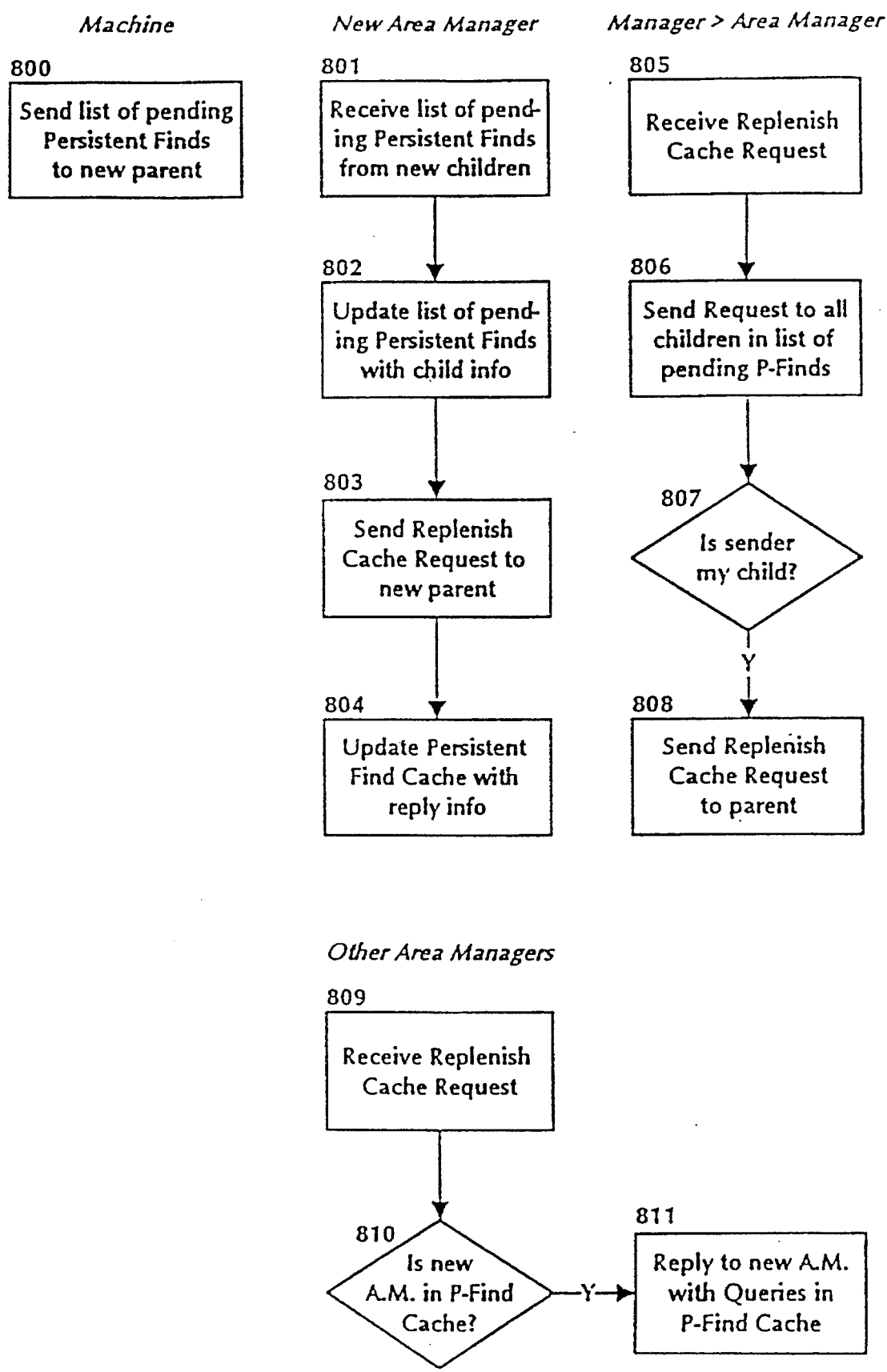
FIG. 26 is a flow chart of a "Resource Recovery" process in accordance with the present invention when an area manager goes down.
Figure 27:
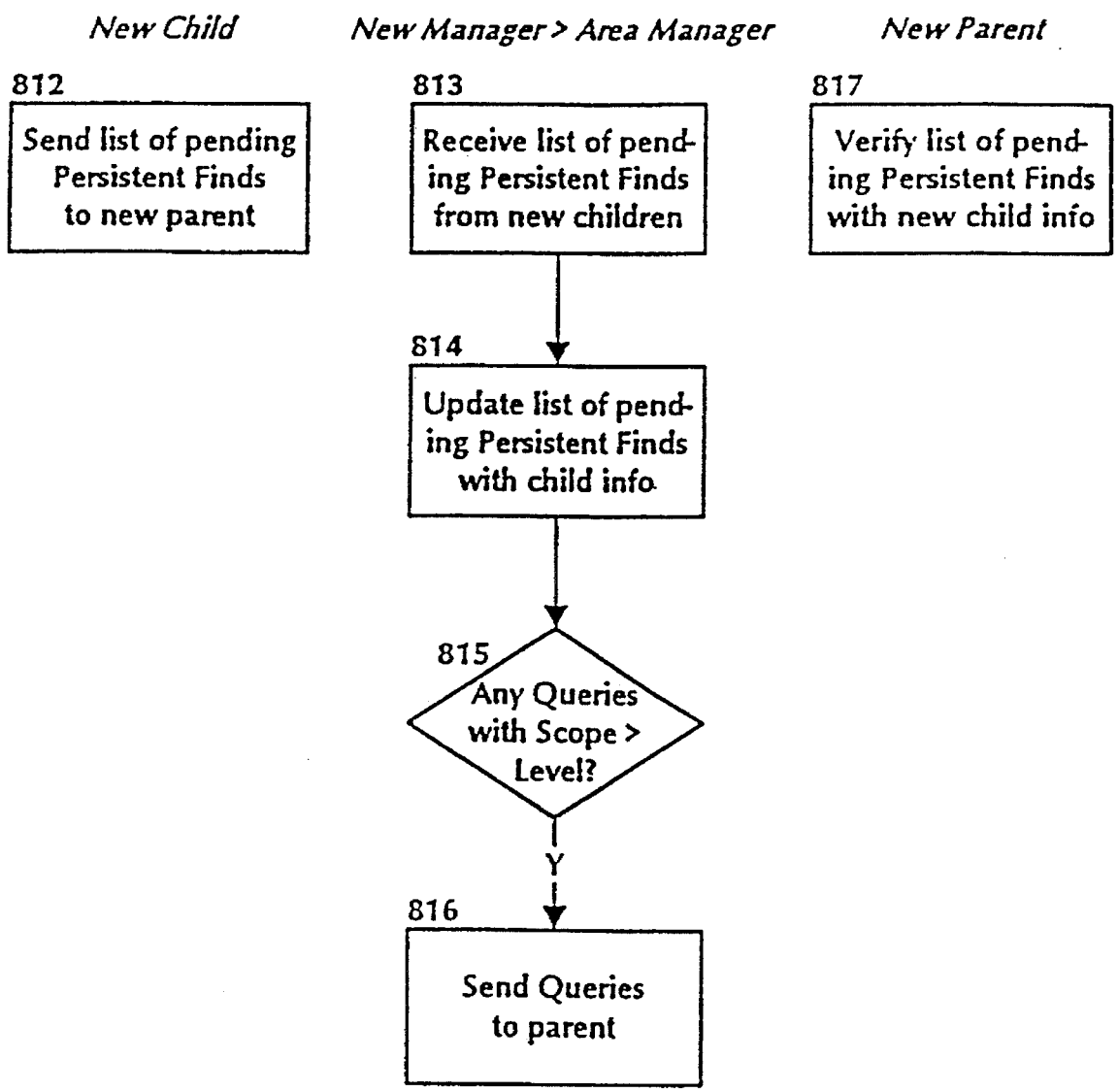
FIG. 27 is a flow chart of a "Resource Recovery" process in accordance with the present invention when another managerial node goes down.

Because important information about distributed Persistent Find Queries is kept at the Area Manager nodes, and to a lesser extent at the other managerial nodes, a recovery process must be used when one of these nodes crashes or becomes disconnected from the rest of the PLN hierarchy. FIGS. 26 and 27 represent the processes used to provide recovery when the Area Manager (FIG. 26) or another managerial node (FIG. 27) goes down.

When a machine logs in to its new parent Area Manager, selected by the Election Process, the child machine sends its source list of pending persistent finds to its new parent (step 800). The new Area Manager receives this list (step 801) and updates its own source list of pending persistent finds using the information received from its children (step 802). The new Area Manager then sends a replenish cache request to its parent (step 803). The other managers receive the request (step 805) and send it to all of its children in the manager's source list of pending persistent finds (step 806). If the sender is the manager's child (step 807), the manager sends the request up the PLN hierarchy to its parent (step 808). Eventually, the other Area Managers in PLN 33 receive the replenish cache request (step 809), and if the new Area Manager has a Query in its persistent find cache (step 810), the receiving Area Manager replies to the new Area Manager with matching queries from its persistent find cache (step 811). The new Area Manager then updates its own Persistent Find Cache with the replies from other Area Managers in PLN 33 (step 804).

FIG. 27 describes the situation that exists when a manager other than an Area Manager goes down. The new manager's children send their source lists of pending persistent finds to the new manager (step 812). The new manager receives these lists (step 813) and update its list of pending persistent finds with the information sent from its children (step 814). If any of the queries are scoped higher than this level (step 815), then the queries are sent up the PLN hierarchy to the new manager's parent (step 816). The new manager's parent verifies its source list of pending persistent finds with the information obtained from its new child (step 817).

Remove Resource Process

Figure 28:
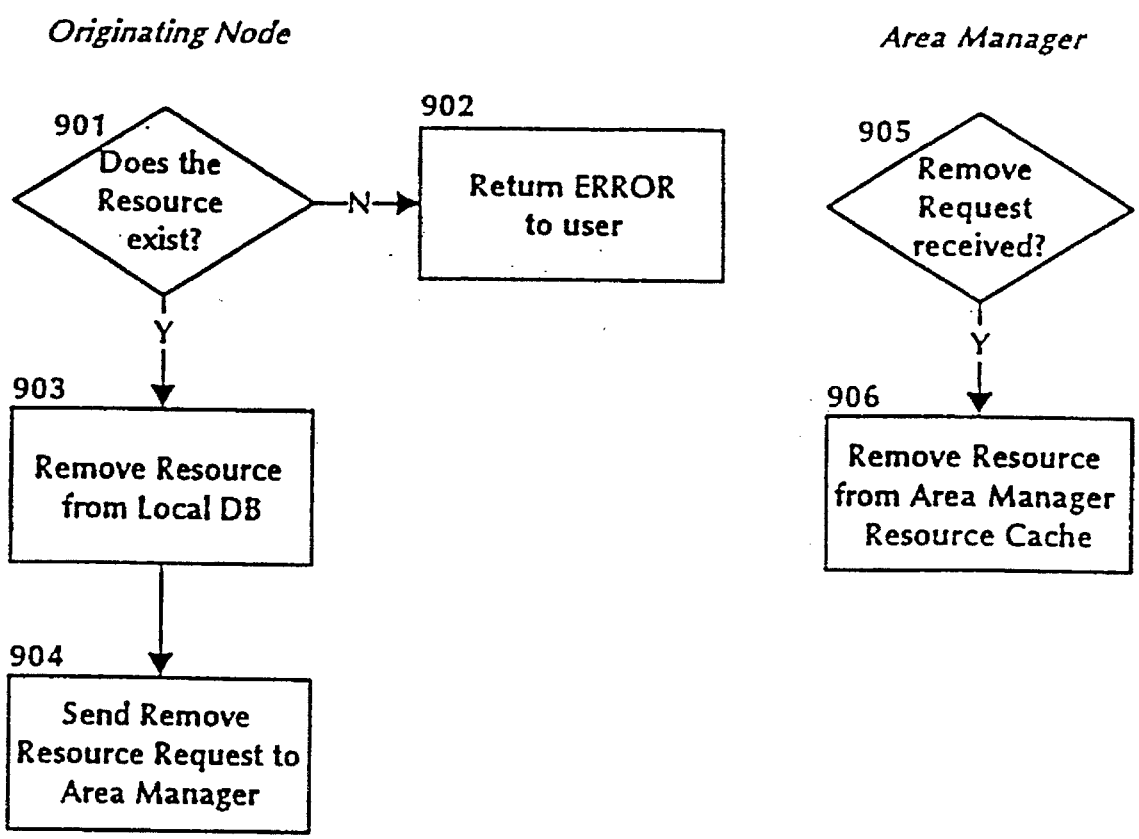
FIG. 28 is a flow chart of a "Remove Resource" process in accordance with the present invention.

When an application withdraws its resources from the PLN hierarchy, Resource Layer 33 executes the Remove Resource Process illustrated in FIG. 28. The node at which the resource originated first check to see if the resource exists in its resource database (step 901). If the resource exists, the originating node removes the resource from the database (step 903) and sends the remove resource request to its parent Area Manager (step 904). If not, the originating node returns an error to the user (step 902). The Area Manager receives the remove resource request (step 905) and removes the resource from its area manager resource cache (step 906).

Context Bridge Layer

FIG. 29A illustrates the components of Context Bridge Layer 38. The main function of Context Bridge Layer is the Routing Process (block 1000), which routes a Protocol Data Unit ("PDU") from a source node to a destination node. The source node and the destination node may share a routable protocol. A routable protocol is defined as a protocol that allows a decision about where a PDU must be sent in order to reach its destination to be made solely from the destination address. The source node merely transfers the PDU to the routable protocol, and the routable protocol itself determines how to get the PDU to its destination by parsing the destination address. Thus, no knowledge of the intermediate nodes used to forward a PDU from the source to the destination is necessary. Within PIPES, TCP/IP and SNA are routable protocols, whereas IPX, NetBios and DLC are non-routable protocols.

If the source node and the destination node share a non-routable protocol, or if the source and destination do not share any protocol at all, intermediate nodes must be used to "bridge" the source and destination nodes. In this case, the Routing Process uses the Routing Information Database ("RIDB", shown as block 1400) to determine how to route a PDU from source to destination. The RIDB contains the information necessary to route a PDU to a non-routable protocol or to a protocol that the source node does not support. The RIDB contains two caches: a source routing cache (block 1401) is used for non-routable protocols, and a next-hop routing cache (block 1402) is used for dissimilar protocol bridging. The source routing cache is populated through the Route Discovery Process (block 1100) and is validated through the Route Validation Process (block 1200). The next-hop routing cache is populated through the Route Advertisement Process (block 1300).

Figure 29B:
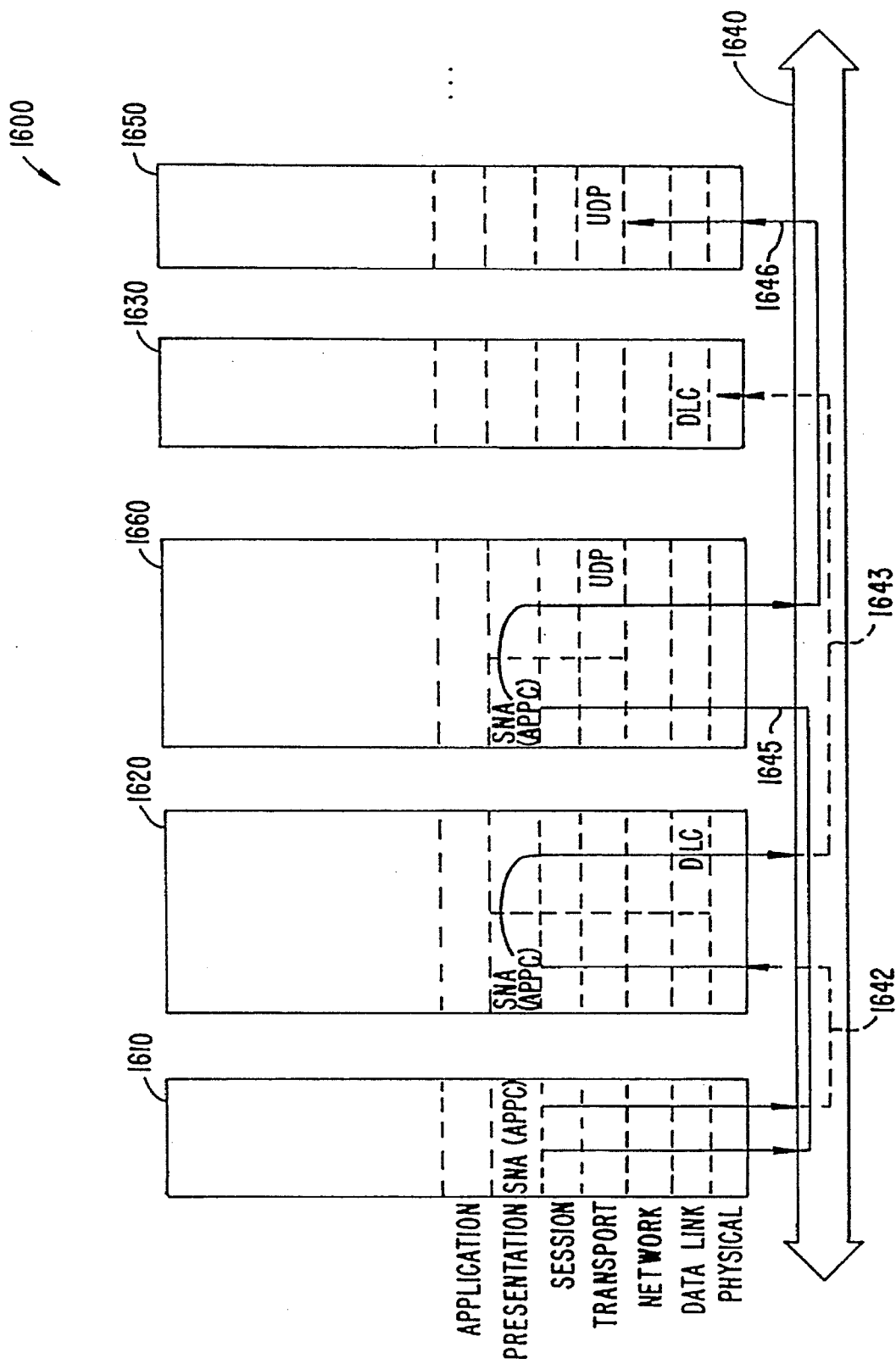
FIG. 29B is an example illustrating the use of context bridges for communication between different protocols.

FIG. 29B illustrates a system 1600 in which the context bridge of the present invention can be advantageously used. The context bridges can be used to route packets generated by nodes using protocols of different levels, as defined in the International Organization of Standardization ("ISO") Reference Model. For example, system 1600 contains two nodes 1610 and 1630 which use the SNA (APPC) and DLC protocols, respectively. These two protocols are at different ISO levels: the SNA is at the presentation level while the DLC is at the data link level. In order to route packets from node 1610 to node 1630 through a network 1640, it is necessary to use a node 1620 containing a context bridge which can bridge the SNA (APPC) and DLC protocols. Thus, the packet generated by node 1610 is first routed to node 1620 via path 1642, which then routes the packet to node 1630 via path 1643.

Similarly, if it is desirable to route a message generated by node 1610 to a node 1650 which uses the UDP protocol (at ISO transport level), it is necessary to use a node 1660 containing a context bridge which can bridge the SNA and UDP protocols. Thus, the packet generated by node 1610 is first routed to node 1660 via path 1645, which then routes the packet to node 1650 via path 1646.

Routing Process

Figure 30:
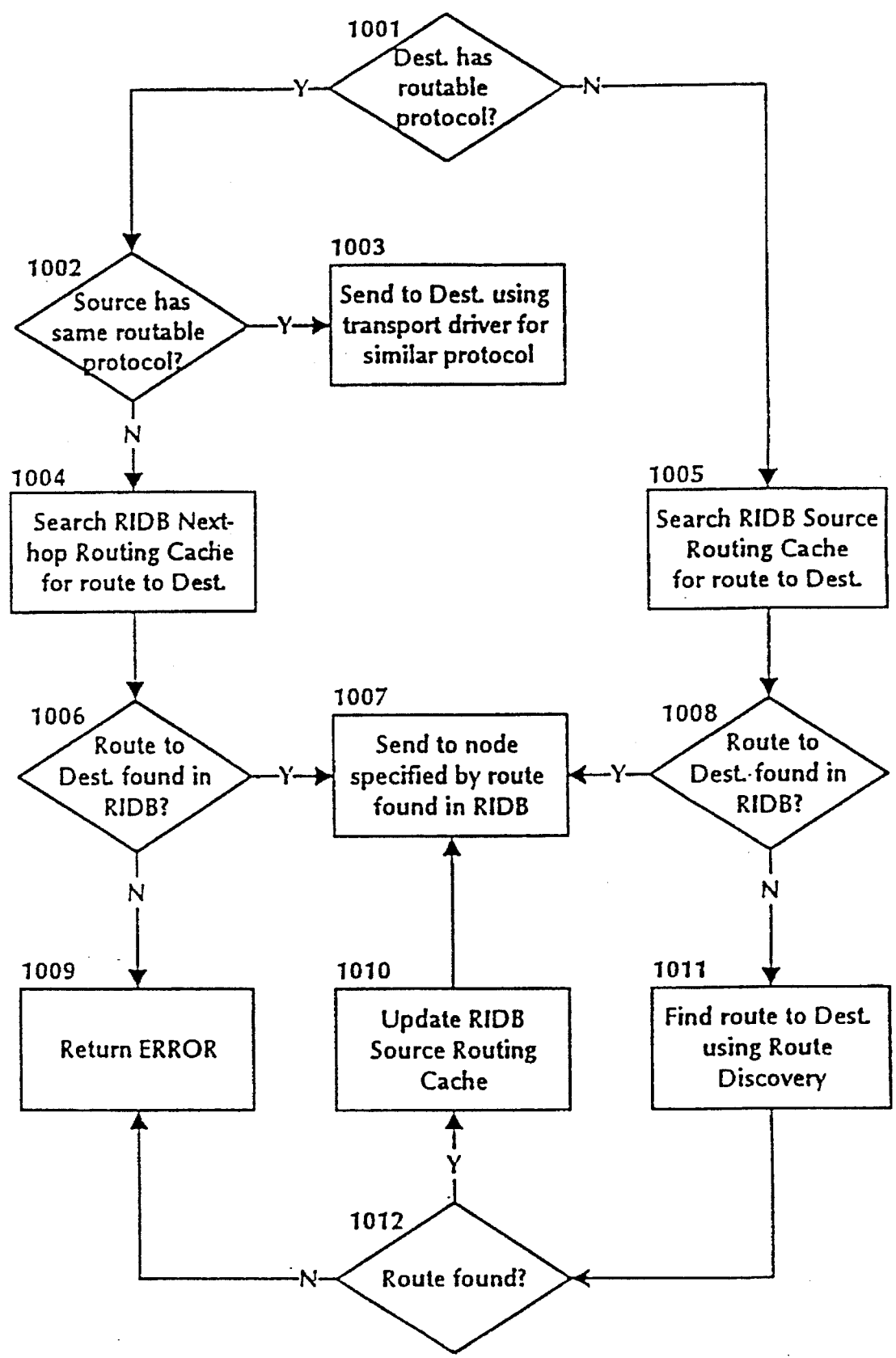
FIG. 30 is a flow chart showing a context bridge routing process in accordance with the present invention.

FIG. 30 depicts a flowchart of the Context Bridge Routing Process. When the source node's Context Bridge Layer receives a PDU to be sent to a given destination node, the source node looks at the destination address to determine whether the destination has a routable protocol (step 1001).

If the destination has a routable protocol, the source node determines whether or not it supports the same routable protocol as the destination (step 1002). If the source and destination share the same routable protocol, the source sends the PDU to the destination using the transport driver for the shared routable protocol (step 1003). If the source and destination do not share the same routable protocol, the source searches its RIDB next-hop routing cache for a route to the destination (step 1004). The source node then checks to see whether a route exists in the RIDB (step 1006). If a route is found, the source sends the PDU to the intermediate node specified by the route found in the RIDB (step 1007). If a route is not found, the source returns an error stating that the destination is not reachable (step 1009).

If the destination has a non-routable protocol, the source searches its RIDB source routing cache for a route to the destination (step 1005). The source node then checks to see whether a route exists in the RIDB (step 1008). If a route is found, the source sends the PDU to the intermediate node specified by the route found in the RIDB (step 1007). If a route is not found, the source executes the Route Discovery Process to find a route to the destination (step 1011). The source node then ascertains whether a route was found by the Route Discovery Process (step 1012). If a route was found by Route Discovery, the source node updates its RIDB source routing cache (step 1010), and sends the PDU to the intermediate node specified by the route (step 1007). If a route was not found, the source node returns an error that the destination is not reachable (step 1009).

Route Discovery Process

Figure 31:
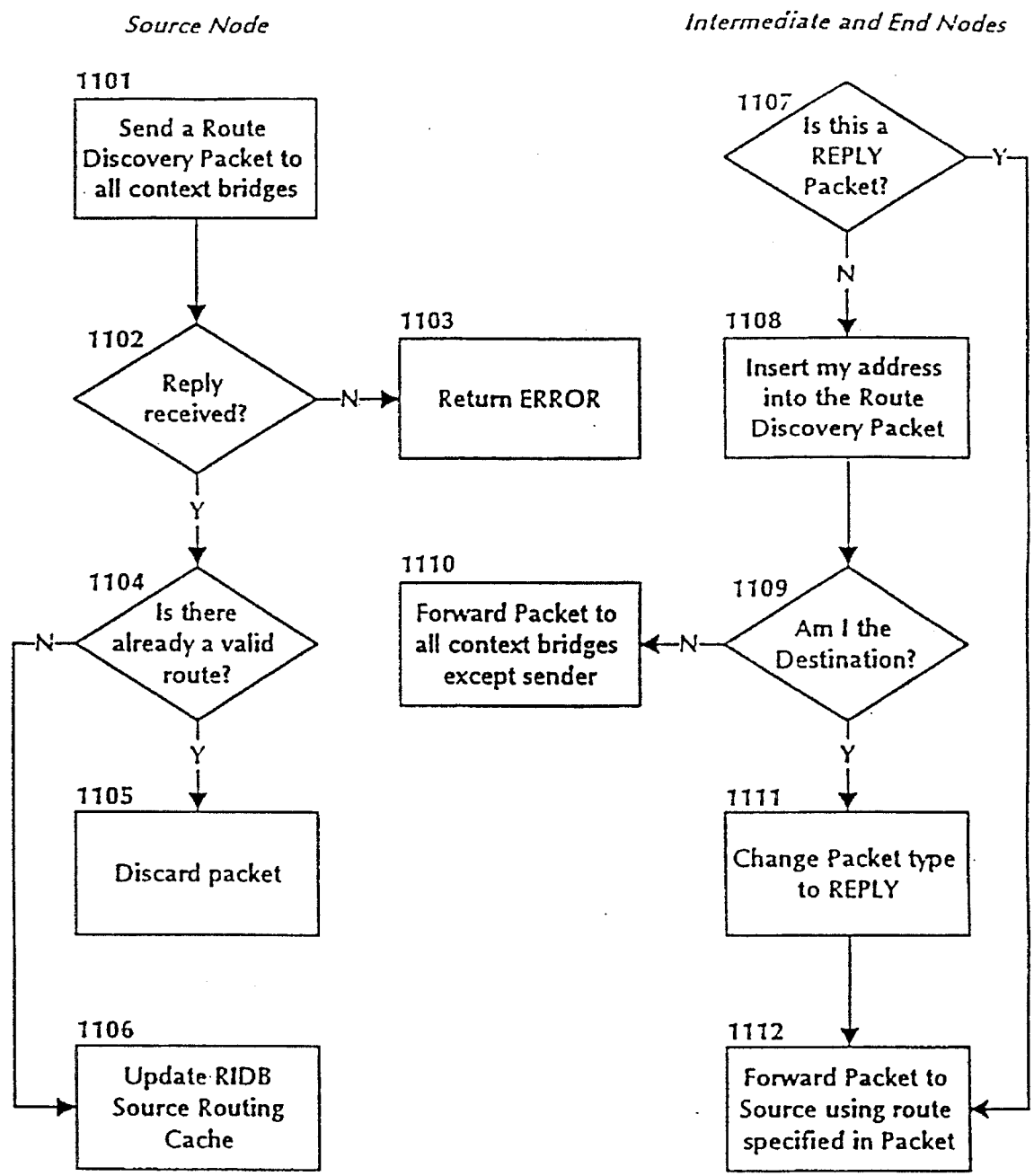
FIG. 31 is a flow chart of a "Route Discovery" process in accordance with the present invention.

FIG. 31 describes the Route Discovery Process, which is used to update the RIDB source routing cache with source routes to individual destinations. A source node initiates the Route Discovery Process when a route to a destination with a non-routable protocol needs to be found. First, a source node sends a Route Discovery Packet to all of the active context bridges about which it has information (step 1101). A node is an active context bridge if it supports more than one protocol; the node acts as a bridge between the protocols found at that node. All of the nodes in the network find out about active context bridges through the Route Advertisement Process.

A context bridge that receives the source node's Route Discovery Packet first determines whether it is a reply packet (step 1107). If it is a reply packet, the intermediate node forwards the packet back to the source node using the route specified in the reply packet (step 1112). If it is not a reply packet, the node receiving the Route Discovery Packet inserts its own address into the packet (step 1108). The node then checks to see if it is the intended destination of the packet (step 1109). If the node is the intended destination of the packet, the end node changes the type of the packet to REPLY (step 1111), and forwards the packet back to the source using the route specified in the Route Discovery Packet (step 1112). If the receiving node is not the destination, the intermediate node forwards the packet to all context bridges to which it is connected except the context bridge from which it originally received the packet (step 1110).

The source node is waiting to see if a reply is received (step 1102). If no reply is received within a specified time period, the source returns an error that the destination is unreachable (step 1103). If a reply is received, the source node checks if there is already a valid route to the destination, (step 1104). If there is already a valid route, the source discards the reply packet (step 1105). Otherwise, the source node updates its RIDB source routing cache with the route specified in the reply packet (step 1106).

Route Validation Process

Figure 32:
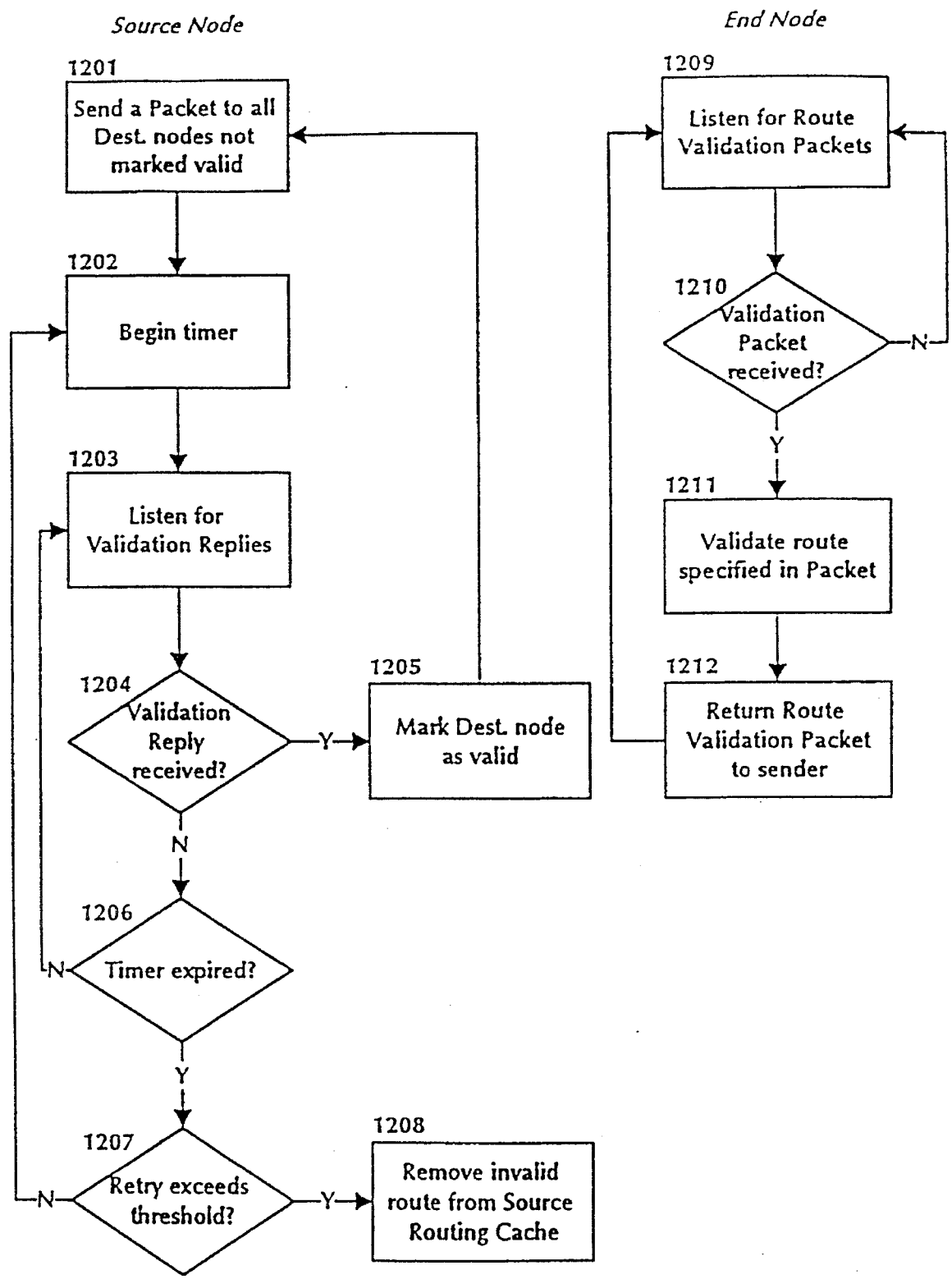
FIG. 32 is a flow chart of a "Route Validation" process in accordance with the present invention.

FIG. 32 illustrates the Route Validation Process, which is used to check the validity of the routes contained in the RIDB source routing cache. The source node sends a Route Validation Packet to all of the destination nodes in its RIDB source routing cache that have not been marked as valid (step 1201). The source then sets a timer (step 1202) and listens for validation replies (step 1203).

The end nodes also listen for Route Validation Packets (step 1209) and checks to see if a Validation Packet is received (step 1210). If a Validation Packet is not received within a specified time period, the end nodes continue listening for Route Validation Packets (step 1209). If a Validation Packet is received, the end nodes validate the route specified in the Route Validation Packet (step 1211) and return the Packet to the sender (step 1212).

The source node checks to see whether a validation reply has been received (step 1204). If a validation reply is received, the source node marks the source route to the destination as valid in the RIDB source routing cache (step 1205). If a validation reply is not received, the source node checks the timer (step 1206). If the timer has not expired, the source node continues to listen for validation replies (step 1203). If the timer has expired, the source node will reset the timer (step 1202) if the retry threshold has not been exceeded (step 1207). If the retry threshold has been exceeded, the source node removes the invalid source route from the RIDB source routing cache (step 1208).

Route Advertisement Process

Figure 33:
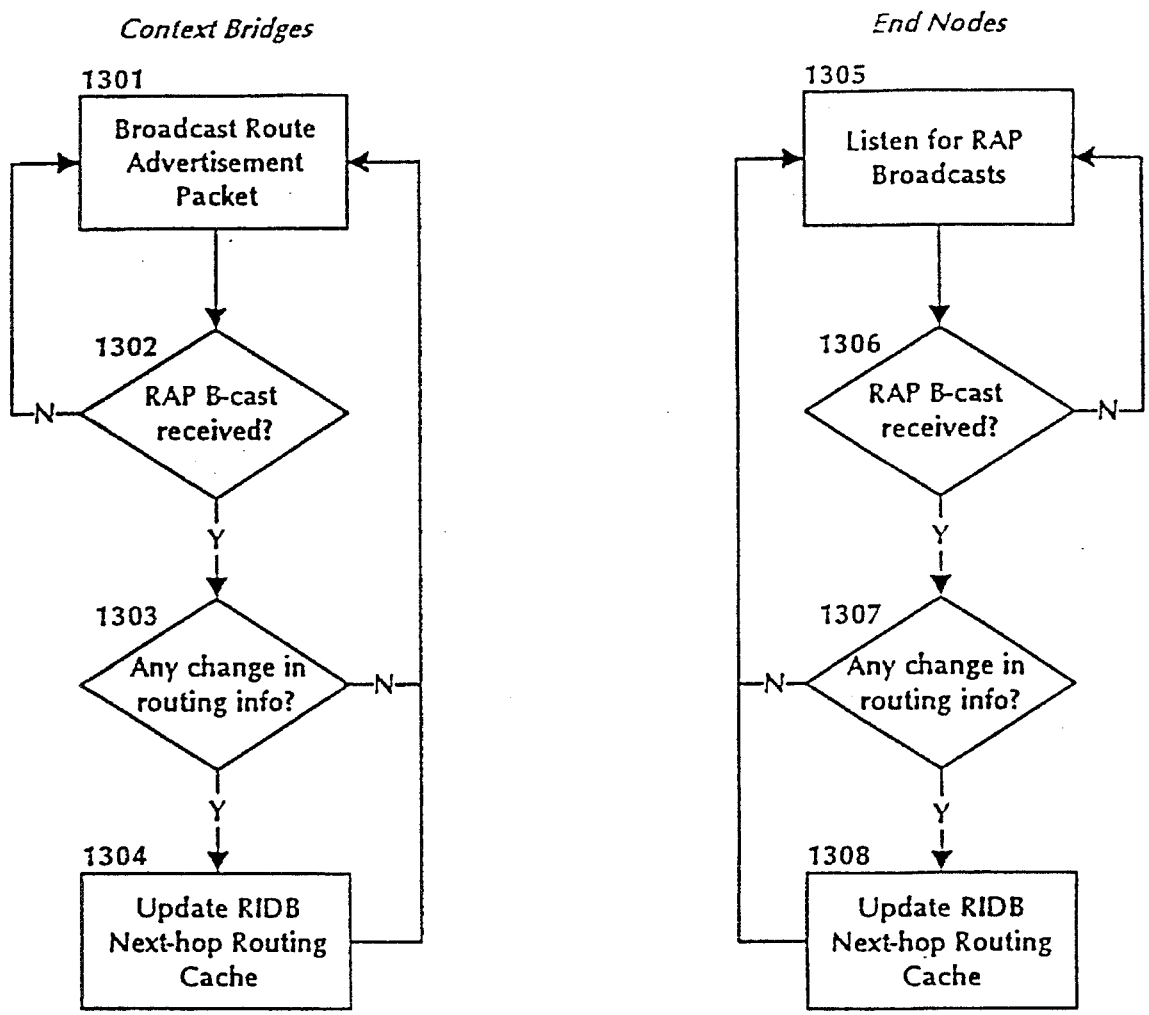
FIG. 33 is a flow chart of a "Route Advertisement" process in accordance with the present invention.

FIG. 33 represents the Route Advertisement Process, a process which is executed intermittently at every active context bridge and end node. Each context bridge periodically sends a broadcast message known as a Routing Advertisement Packet ("RAP") (step 1301), and each end node listens for RAP broadcasts (step 1305). The RAP preferably contains the following information: the protocols that can be handled by the context bridge and the number of hops required. All context bridges and end nodes then wait until a RAP broadcast is received (steps 1302 and 1306). If a RAP broadcast is received, the node receiving the broadcast determines if there is any change in routing information by comparing the RAP broadcast with its RIDB next-hop routing cache (steps 1303 and 1307). If changes are necessary, the receiving node updates its RIDB next-hop routing cache (steps 1304 and 1308).

Unlimited Levels

Figure 34:
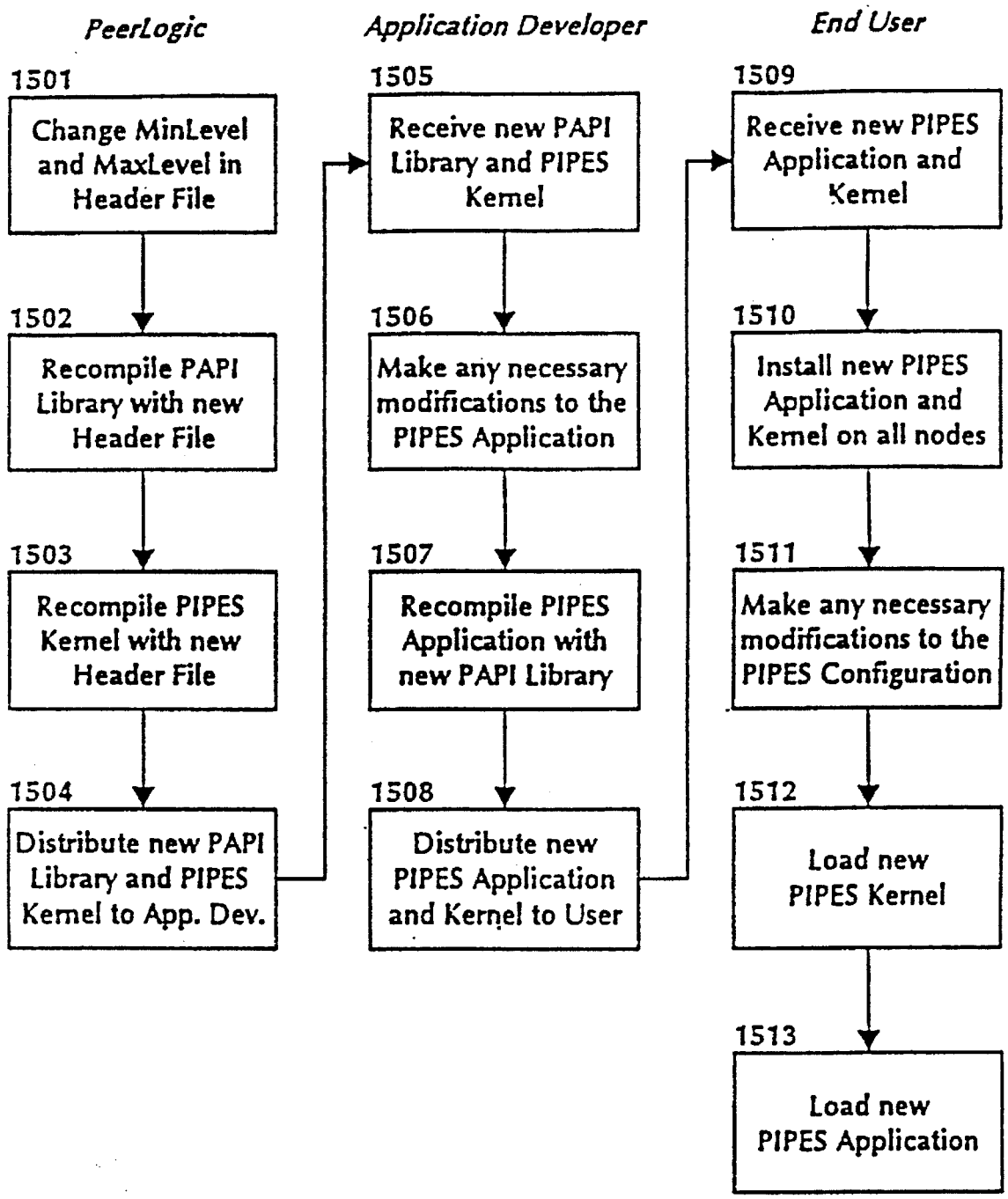
FIG. 34 is a flow chart showing the steps performed in changing the number of levels in the PIPES logical network of the present invention.

In the preferred embodiment of the present invention, the number of levels in the PLN hierarchy is not limited. FIG. 34 illustrates the steps that is preferred taken by developer of system 100 (the system developer), the application developer, and the end user to implement a larger number of levels than the default number of levels (e.g., five). The maximum number of levels of a certain implementation is set when the PIPES kernel and PAPI library code is compiled. If it is desirable to have greater flexibility in their PIPES and greater number of levels in the hierarchy, the PIPES kernel and PAPI library need to be customized.

The system developer changes the MinLevel and MaxLevel parameters that are hard-coded in a header file of the software (step 1501). The PAPI library (step 1502) and PIPES kernel (step 1503) will be recompiled, and the new PAPI library and PIPES kernel are distributed to the application developer (step 1504).

The application developer receives these components from the system developer (step 1505) and makes any necessary modifications to their own PIPES application (step 1506). The application developer then recompiles its own PIPES application with the new PAPI library (step 1507) and distributes the new PIPES application and PIPES kernel to the end user (step 1508).

The end user receives these components from the application developer (step 1509) and installs them on all of the nodes in the PLN (step 1510). After making any necessary modifications to its PIPES configuration (step 1511), the end user finally restarts the system by loading the PIPES kernel (step 1512) and the PIPES application (step 1513). At this point, the end user can realize the number of levels desired in the PLN hierarchy.

While the present invention has been described with what is presently considered to be the preferred embodiments, it is to be understood that the appended claims are not to be limited to the disclosed embodiments, but on the contrary, are intended to cover modifications, variations, and equivalent arrangements which retain any of the novel features and advantages of the invention.

What is claimed is:

1. A method for determining routing paths in a context bridge which is able to route packets between nodes having different communication protocols at different levels, the context bridge being one of many context bridges in a heterogeneous network containing a plurality of nodes, the method comprising the steps of:

setting up a list of context bridges and the communication protocols handled by each context bridge in the list;

listening for routing information packets which are periodically broadcast by other context bridges informing recipients of the communication protocols handled by the broadcasting context bridge;

updating the list using the information contained in the received routing information packets; and determining the routing paths in the context bridge using the updated list.

2. A method as recited in claim 1 wherein each node has a routing protocol, the method further comprising the steps of:

receiving a packet at a source node to be routed to a destination node using at least one context bridge;

determining whether the destination node of the packet has a routable protocol;

if the destination has no routable protocol,
sending a route discovery packet to discover one or more context bridges so as to route the packet from the source to the destination node, and
routing the packet to the destination through the one or more discovered context bridges; and if the destination has a routable protocol, routing the packet from the source to the destination using the routable protocol.

* * * * *